(12) United States Patent
Wernersson et al.

(10) Patent No.: US 10,284,270 B2
(45) Date of Patent: *May 7, 2019

(54) PRECODING A TRANSMISSION FROM AN ANTENNA ARRAY THAT INCLUDES CO-POLARIZED ANTENNA ELEMENTS ALIGNED IN A GIVEN SPATIAL DIMENSION

(71) Applicant: Telefonaktiebolaget LM Ericsson (publ), Stockholm (SE)

(72) Inventors: Niklas Wernersson, Kungsängen (SE); Svante Bergman, Hägersten (SE); Sebastian Faxér, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,653

(22) Filed: Jun. 7, 2018

(65) Prior Publication Data

US 2018/0287676 A1 Oct. 4, 2018

Related U.S. Application Data

(63) Continuation of application No. 14/902,749, filed as application No. PCT/SE2015/050936 on Sep. 4, 2015, now Pat. No. 10,020,857.

(51) Int. Cl.
*H04B 7/0456* (2017.01)
*H04B 7/06* (2006.01)

(52) U.S. Cl.
CPC ......... *H04B 7/0469* (2013.01); *H04B 7/0478* (2013.01); *H04B 7/065* (2013.01)

(58) Field of Classification Search
CPC .. H04B 7/0456; H04B 7/0639; H04B 7/0617; H04B 7/0469; H04B 7/0478
See application file for complete search history.

(56) References Cited

U.S. PATENT DOCUMENTS 5,852,630 A 12/1998 Langberg et al.
8,494,033 B2 7/2013 Jöngren et al.
(Continued)

FOREIGN PATENT DOCUMENTS

WO 2017039510 A1 3/2017

OTHER PUBLICATIONS

Yang, D., et al., "DFT-based Beamforming Weight-Vector Codebook Design for Spatially Correlated Channels in the Unitary Precoding Aided Multiuser Downlink", IEEE International Conference on Communications (ICC), May 23, 2010, pp. 1-5, IEEE, retrieved on Dec. 2, 2015, retrieved from the internet: https://www.mysciencework.com/publication/read/2241528/dft-based-beamforming-weight-vector-codebook-design-for-spacially-correlated-channels-in-the-unitary-precoding-aided-multiuser-d#page-null.
(Continued)

*Primary Examiner* — Sung S Ahn
(74) *Attorney, Agent, or Firm* — Coats & Bennett, PLLC

(57) ABSTRACT

A transmitting radio node precodes a transmission from an antenna array to a receiving radio node. The array includes co-polarized antenna elements aligned in a given spatial dimension of the array. The transmitting radio node precodes the transmission from different subarrays of the antenna elements using respective coarse-granularity precoders that are factorizable from a multi-granular precoder targeting the given spatial dimension of the array at different granularities, so as to virtualize the subarrays as different auxiliary elements. The transmitting radio node also precodes the transmission from the different auxiliary elements using one or more finer-granularity precoders that are also factorizable from the multi-granular precoder. In this case, the coarse granularity precoders and the one or more finer-granularity precoders are represented within one or more codebooks used for said preceding.

32 Claims, 17 Drawing Sheets

(56) References Cited

U.S. PATENT DOCUMENTS

| | | | |
|---|---|---|---|
| 10,020,857 B2* | 7/2018 | Wernersson | H04B 7/0469 |
| 2011/0305263 A1* | 12/2011 | Jöngren | H04B 7/0617 375/219 |
| 2013/0229980 A1 | 9/2013 | Wernersson et al. | |
| 2013/0230081 A1* | 9/2013 | Wernersson | H04B 7/0617 375/219 |
| 2013/0272263 A1 | 10/2013 | Pi et al. | |
| 2013/0322280 A1 | 12/2013 | Pi | |
| 2014/0016549 A1 | 1/2014 | Novlan et al. | |
| 2014/0050159 A1 | 2/2014 | Frenne et al. | |
| 2014/0098689 A1 | 4/2014 | Lee et al. | |
| 2014/0226702 A1 | 8/2014 | Onggosanusi et al. | |
| 2016/0043789 A1 | 2/2016 | Wang et al. | |
| 2016/0043791 A1 | 2/2016 | Nam | |
| 2016/0204842 A1 | 7/2016 | Song et al. | |
| 2016/0211895 A1 | 7/2016 | Onggosanusi et al. | |
| 2016/0218782 A1 | 7/2016 | Janis et al. | |

OTHER PUBLICATIONS

Zhang, Y. et al., "A novel codebook design with the LBG algorithm in precoding systems under spatial correlated channel", 2010 International Conference on Communications, Circuits and Systems (ICCCAS), Jul. 28, 2010, pp. 32-36, IEEE.

Wang, Y., et al., "Kronecker product-based codebook design and optimisation for correlated 3D channels", Transactions on Emerging Telecommunications Technologies, Published online Dec. 5, 2014, pp. 1225-1234, John Wiley & Sons, Ltd.

Telefonaktiebolaget L M Ericsson (Publ), "Precoding a Transmission From a One-Dimensional Antenna Array That Includes Co-Polarized Antenna Elements Aligned in the Array's Only Spatial Dimension", PCT Application No. PCT/SE2015/050935, filed Sep. 4, 2015, pp. 1-52.

Alcatel-Lucent Shanghai Bell et al., "Proposals for Beamformed CSI-RS based 3D MIMO Transmission Scheme", 3GPP TSG RAN WG1 Meeting #82, Aug. 24-28, 2015, pp. 1-5, Beijing, China, R1-153814.

Catt, "Codebook structure for FD-MIMO", 3GPP TSG WG1 Meeting #82, Aug. 24-28, 2015, pp. 1-6, Beijing, China, R1-153939.

Samsung, "4Tx and 8Tx feedback framework for Rel. 10", TSG RAN WG1 Meeting #62, Aug. 23-27, 2010, pp. 1-13, Madrid, Spain, R1-104602.

Samsung, "Performance Evaluation of Class B CSI Reporting", 3GPP TSG RAN WG1 Meeting #82bis, Oct. 5-9, 2015, pp. 1-3, Malmö, Sweden, R1-156100.

Ericsson, et al., "Further Refinements of Feedback Framework", 3GPP TSG-RAN WG1 #60bis, Beijing, China, Apr. 12, 2010, pp. 1-8, R1-101742, 3GPP.

Alcatel-Lucent Shanghai Bell et al., "Consideration on CSI feedback enhancements for high-priority antenna configurations", 3GPP TSG-RAN WG1 #66, Athens, Greece, Aug. 22, 2011, pp. 1-7, R1-112420, 3GPP.

* cited by examiner

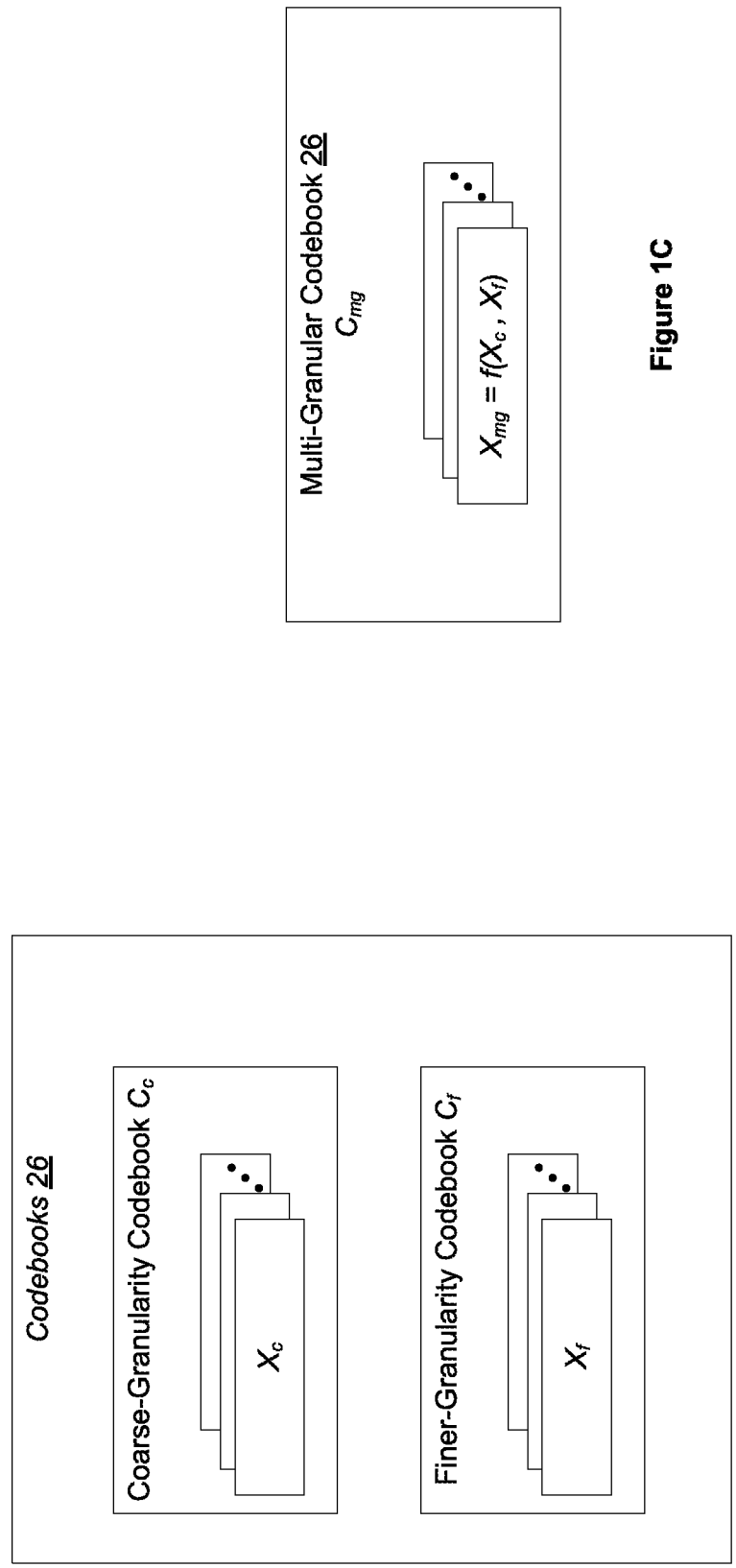

PRECODING A TRANSMISSION FROM AN ANTENNA ARRAY THAT INCLUDES CO-POLARIZED ANTENNA ELEMENTS ALIGNED IN A GIVEN SPATIAL DIMENSION

RELATED APPLICATIONS

This application is a continuation of prior U.S. patent application Ser. No. 14/902,749, filed Jan. 4, 2016, which was the National Stage of International Application No. PCT/SE2015/050936, filed Sep. 4, 2015, the disclosures of all of which are incorporated by reference herein in their entirety.

TECHNICAL FIELD

The present application relates generally to transmission precoding, and relates specifically to precoding a transmission from an antenna array that includes co-polarized antenna elements aligned in a given spatial dimension.

BACKGROUND

Precoding a transmission from an antenna array involves applying a set of complex weights to the signals that are to be transmitted from the array's antenna elements, so as to independently control the signals' phase and/or amplitude. This set of complex weights is referred to as a "precoder". The transmitting node conventionally chooses the precoder to match the current channel conditions on the link to the receiving node, with the aim of maximizing the link capacity or quality. If multiple data streams are simultaneously transmitted from the array's antenna elements using spatial multiplexing, the transmitting node also typically chooses the precoder with the aim of orthogonalizing the channel and reducing inter-stream interference at the receiving node.

In closed-loop operation, the transmitting node selects the precoder based on channel state information (CSI) fed back from the receiving node that characterizes the current channel conditions. The transmitting node in this regard transmits a reference signal from each antenna element to the receiving node, and the receiving node sends back CSI based on measurement of those reference signals. Transmission of the reference signals and feedback of the CSI contribute significant overhead to precoding schemes. For example, these reference signals and CSI feedback consume a significant amount of transmission resources (e.g., time-frequency resource elements in Long Term Evolution, LTE, embodiments).

Known approaches reduce overhead attributable to reference signal transmission by dedicating a reference signal for CSI measurement. LTE Release 10, for example, introduces a CSI Reference Signal (CSI-RS) specifically designed for CSI measurement. Unlike the cell-specific common reference signal (CRS) in previous LTE release, the CSI-RS is not used for demodulation of user data and is not precoded. Because the density requirements for data demodulation are not as stringent for CSI measurement, the CSI-RS can be relatively sparse in time and frequency, thereby reducing the number of transmission resources required for transmitting the CSI-RS.

Known approaches reduce overhead attributable to CSI feedback by limiting the usable precoders to a fixed set of precoders, i.e., a codebook. Each precoder in the codebook is assigned a unique index that is known to both the transmitting node and the receiving node. The receiving node determines the "best" precoder from the codebook, and feeds back the index of that precoder (often referred to as a "precoding matrix indicator", PMI) to the transmitting node as a recommendation (which the transmitting node may or may not follow). Feeding back only an index, in conjunction with other CSI such as the recommended number of data streams (i.e., transmission rank) for spatial multiplexing, reduces the number of transmission resources required for transporting that CSI. This approach therefore reduces CSI feedback overhead considerably as compared to explicitly feeding back complex valued elements of a measured effective channel.

Despite this, overhead from closed-loop precoding remains problematic as antenna array technology advances towards more and more antenna elements. This antenna element escalation stems not only from increases to the number of elements in the traditional one-dimensional antenna array, but also from adoption of two-dimensional antenna arrays that enable beamforming in both the vertical and horizontal spatial dimension. Furthermore, although a codebook reduces CSI overhead, the effective channel quantization inherent in the codebook has heretofore limited the codebook's ability to flexibly adapt to different propagation environments.

SUMMARY

Codebook-based precoding according to teachings herein uses a multi-granular precoder that targets a given spatial dimension of an antenna array at different granularities. A multi-granular precoder in this regard factorizes (e.g., by way of a Kronecker Product) into a coarse-granularity precoder and one or more finer-granularity precoders. Some embodiments exploit the multi-granular nature of such precoding to reduce the overhead associated with precoding. For example, some embodiments reduce the amount of transmission resources needed for transmitting reference signals, reduce the amount of transmission resources needed for transmitting CSI feedback, and/or reduce the computational complexity required to determine the CSI to feed back. Still other embodiments additionally or alternatively adapt the precoding codebook(s) to different propagation environments.

In particular, embodiments herein include a method for precoding a transmission from an antenna array that includes co-polarized antenna elements aligned in a given spatial dimension of the array. The method is performed by a transmitting radio node for precoding the transmission to a receiving radio node. The method comprises precoding the transmission from different subarrays of the antenna elements using respective coarse-granularity precoders. These precoders are factorizable from a multi-granular precoder targeting the given spatial dimension of the array at different granularities, so as to virtualize the subarrays as different auxiliary elements. The method also includes precoding the transmission from the different auxiliary elements using one or more finer-granularity precoders that are also factorizable from the multi-granular precoder. The coarse granularity precoders and the one or more finer-granularity precoders are represented within one or more codebooks used for said precoding.

In at least some embodiments, the transmission comprises user data or a reference signal dedicated to the receiving radio node.

Alternatively or additionally, the transmitting radio node transmits a full-elements reference signal from the antenna elements without precoding. In one embodiment, the transmitting radio node also precodes transmission of an auxiliary-elements reference signal (e.g., at a later time) from the different subarrays of the antenna elements using respective coarse-granularity precoders that are factorizable from a multi-granular precoder targeting the given spatial dimension of the array at different granularities, so as to virtualize the subarrays as the different auxiliary elements. Finally, the transmitting radio node transmits the precoded, auxiliary-elements reference signal to the receiving radio node.

In this case, the full-elements and auxiliary-elements reference signals may be common reference signals transmitted from the antenna array to multiple receiving radio nodes.

In any event, the transmitting radio node in some embodiments transmits the precoded, auxiliary-elements reference signal more often than transmitting the full-elements reference signal. Alternatively, the transmitting radio node interlaces the precoded, auxiliary-elements reference signal with the full-elements reference signal in time.

In one or more embodiments, the transmitting radio node also receives from the receiving radio node, at different times, a complete recommendation that recommends both a coarse-granularity precoder and a finer-granularity precoder, and a partial recommendation that recommends only a finer-granularity precoder. In this case, precoding uses both a coarse-granularity precoder from the complete recommendation and a finer-granularity precoder from the partial recommendation.

In one such embodiment, the transmitting radio node receives a partial recommendation more often than receiving a complete recommendation.

Alternatively or additionally, the transmitting radio node may configure the receiving radio node to restrict precoders from which the receiving radio node selects, for recommending to the transmitting radio node, to a subset of precoders in a codebook that correspond to one or more coarse-granularity precoders, by transmitting codebook subset restriction signaling to the receiving radio node indicating those one or more coarse-granularity precoders.

In any of these embodiments, the different subarrays may have a different number of antenna elements. In one such embodiment, one of the respective coarse-granularity precoders is a truncated version of another one of the coarse-granularity precoders. Alternatively, the different subarrays may instead have the same number of antenna elements. In this case, the respective coarse-granularity precoders may be equal among the different subarrays.

In one or more embodiments, the transmitting radio node's antenna array further includes other co-polarized antenna elements aligned in another spatial dimension of the array. In this case, the transmitting radio node in some embodiments precodes the transmission from different subarrays of the other antenna elements with respective coarse-granularity precoders that are factorizable from another multi-granular precoder targeting the other spatial dimension of the array at different granularities, so as to virtualize the subarrays as other auxiliary elements. The transmitting radio node also precodes the transmission from the other auxiliary elements with one or more finer-granularity precoders that are also factorizable from the other multi-granular precoder.

Embodiments herein also include a method for receiving a transmission from an antenna array that includes co-polarized antenna elements aligned in a given spatial dimension of the array. The antenna array is associated with a transmitting radio node. The method is performed by a receiving radio node. The method comprises receiving a first reference signal transmitted from the antenna array. Based on measurement of the first reference signal, the method entails generating a first type of recommendation that recommends either: (i) a multi-granular precoder in a multi-granular codebook targeting the given spatial dimension of the array at different granularities, each multi-granular precoder in the codebook comprising a combination of a coarse-granularity precoder and one or more finer-granularity precoders; or (ii) a coarse-granularity precoder in a coarse-granularity codebook and one or more finer-granularity precoders in one or more finer-granularity codebooks, the combination of which corresponds to a multi-granular precoder targeting the given spatial dimension of the array at different granularities. In either case, though, the method includes transmitting the first type of recommendation to the transmitting radio node.

The method also entails receiving a second reference signal transmitted from the antenna array. Based on measurement of the second reference signal, the method involves generating a second type of recommendation that recommends one or more finer-granularity precoders factorizable from a multi-granular precoder. And the method also includes transmitting the second type of recommendation to the transmitting radio node.

Finally, the method comprises receiving from the antenna array a data transmission that is precoded based on the first and second types of recommendations.

In at least one such embodiment, the first reference signal is a full-elements reference signal transmitted from the antenna elements without precoding. The second reference signal may be an auxiliary-elements reference signal transmitted from different subarrays of the antenna elements using respective coarse-granularity precoders that are factorizable from a multi-granular precoder targeting the given spatial dimension of the array at different granularities, so as to virtualize the subarrays as different auxiliary elements. In this case, the second type of recommendation exclusively recommends one or more finer-granularity precoders, without also recommending a coarse-granularity precoder.

In such embodiments, the method may entail receiving the precoded, auxiliary-elements reference signal more often than receiving the full-elements reference signal. Additionally or alternatively, the method may be further characterized by receiving the precoded, auxiliary-elements reference signal interlaced with the full-elements reference signal in time.

In some embodiments, the method is further characterized by transmitting the second type of recommendation to the transmitting radio node more often than transmitting the first type of recommendation to the transmitting radio node.

In any case, though, both the first and second reference signals may alternatively be full-elements reference signals transmitted from the antenna elements without precoding. In one such embodiment, the receiving radio node generates the second type of recommendation to exclusively recommend one or more finer-granularity precoders, without also recommending a coarse-granularity precoder.

Alternatively, both the first and second reference signals may be full-elements reference signals transmitted from the antenna elements without precoding. But the receiving radio node generates the second type of recommendation to recommend either (i) a multi-granular precoder in the multi-granular codebook, wherein the multi-granular precoder factors into the coarse-granularity precoder from the first recommendation or (ii) a coarse-granularity precoder in the coarse-granularity codebook and one or more finer-granularity precoders in one or more finer-granularity codebooks, wherein the coarse-granularity precoder is the coarse-granularity precoder from the first type of recommendation.

Embodiments herein also include a method for receiving a transmission from an antenna array that includes co-polarized antenna elements aligned in a given spatial dimension of the array. The antenna array is associated with a transmitting radio node. The method is performed by a receiving radio node and is characterized by receiving codebook subset restriction signaling from the transmitting radio node that indicates one or more coarse-granularity precoders. Each coarse-granularity precoder is factorizable along with one or more finer-granularity precoders from a multi-granular precoder targeting the given spatial dimension of the array at different granularities. Based on this signaling, the method entails restricting precoders from which the receiving radio node selects for recommending to the transmitting radio node to a subset of precoders in a codebook that correspond to the one or more indicated coarse-granularity precoders. The method further includes transmitting to the transmitting radio node a recommended precoder that is selected according to the restricting, and receiving from the antenna array a data transmission that is precoded based on the recommended precoder.

In one or more embodiments, this method is further characterized by receiving a full-elements reference signal transmitted from the antenna elements without precoding. Based on measurement of the full-elements reference signal, the method includes selecting said recommended precoder as either: (i) a multi-granular precoder in a multi-granular codebook, from amongst a subset of multi-granular precoders in the codebook that factorize into any of the one or more coarse-granularity precoders indicated by the codebook subset restriction signaling; or (ii) a coarse-granularity precoder in a coarse-granularity codebook, from amongst the one or more coarse-granularity precoders indicated by the codebook subset restriction signaling. Regardless, the method further includes transmitting the recommendation to the transmitting radio node.

In any of the above embodiments, note that one or more parameterized codebooks may define sets of different possible coarse-granularity precoders and finer-granularity precoders. These one or more codebooks are signaled in some embodiments from the transmitting radio node to the receiving radio node in the form of a length of the precoders.

Also in any of the above embodiments, the antenna array may be a one-dimensional array in the spatial domain and the given spatial dimension is either a horizontal dimension or a vertical dimension. Alternatively, the antenna array is a two-dimensional array in the spatial domain such that the antenna array has a horizontal dimension and a vertical dimension, and the given spatial dimension is either the horizontal dimension or the vertical dimension.

Still in any of the above embodiments, a multi-granular precoder may be based on a Kronecker Product of a coarse-granularity precoder and one or more finer-granularity precoders.

Alternatively or additionally, the coarse-granularity precoder and the one or more finer-granularity precoders may be Discrete Fourier Transform, DFT, vectors, wherein the product of the DFT vectors' lengths equals the number of the antenna elements aligned along the given spatial dimension.

Embodiments herein further include corresponding apparatus, computer programs, and computer program products.

BRIEF DESCRIPTION OF THE DRAWINGS

FIGS. 1B and 1C are block diagrams of different precoding codebooks according to one or more embodiments.

DETAILED DESCRIPTION

Figure 1A:
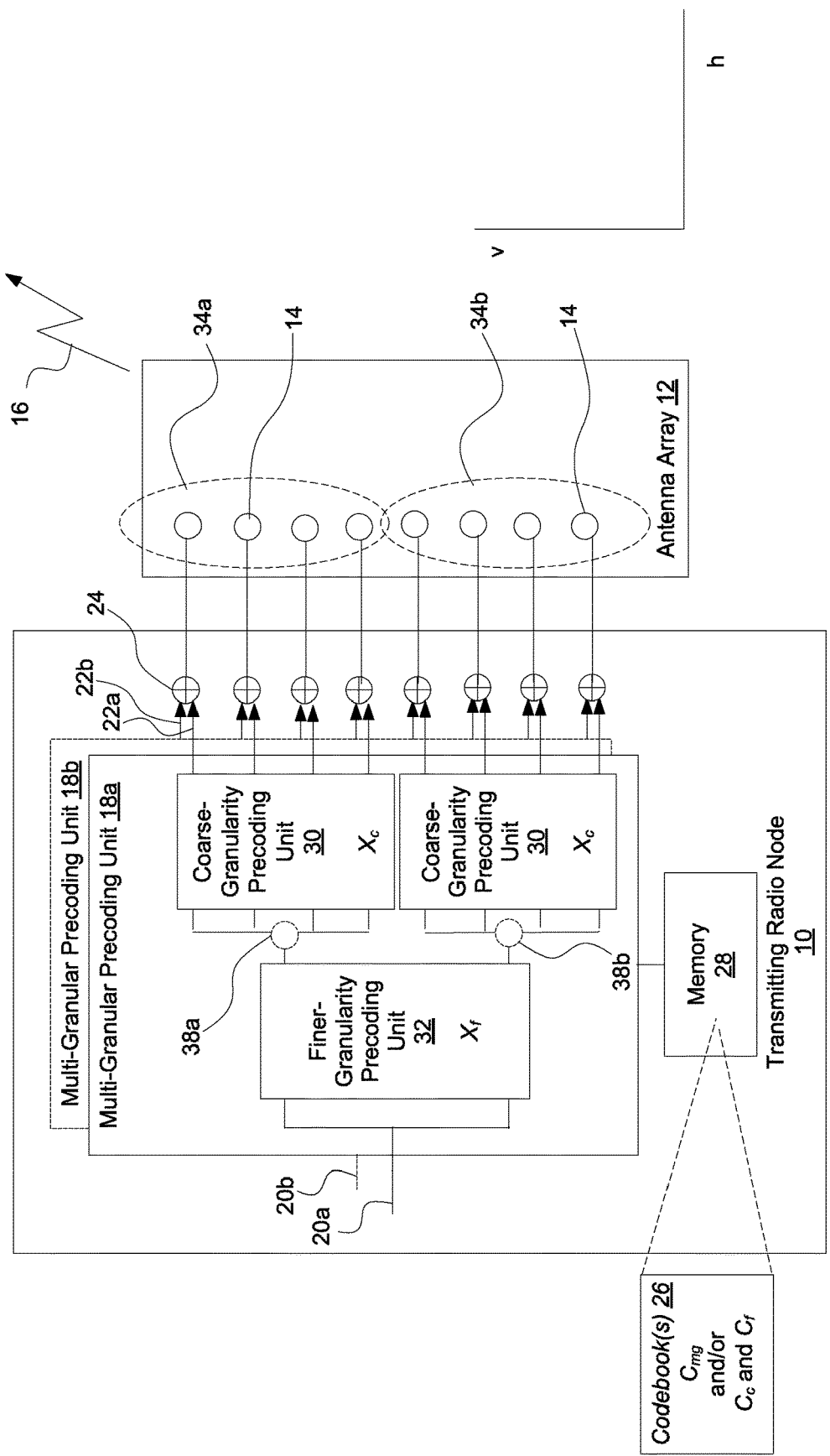
FIG. 1A is a block diagram of a transmitting radio node configured to precode a transmission from an antenna array according to one or more embodiments.

FIG. 1A depicts a transmitting radio node 10, referred to for convenience as transmitting node 10. The transmitting node 10 (e.g., an enhanced Node B in Long Term Evolution, LTE, embodiments) performs transmissions from an associated antenna array 12. The array 12 includes co-polarized antenna elements 14 aligned in a given spatial dimension of the array 12 (e.g., in a horizontal dimension h or a vertical dimension v). As shown, for example, the array 12 includes eight co-polarized antenna elements 14 aligned in the array's vertical dimension v. The array 12 may include other antenna elements as well, but these elements are not shown in FIG. 1A or considered in FIG. 1A's description.

The transmitting node 10 is configured to transmit a transmission 16 from the antenna array 12 to a receiving radio node (not shown and hereinafter referred to simply as "receiving node"). The transmission 16 in some embodiments, for example, comprises user data and/or a reference signal dedicated to the receiving node (e.g., a UE-specific reference signal or a Demodulation Reference Signal in LTE embodiments). The transmitting node 10 is configured to precode this transmission 16. FIG. 1A depicts the transmitting node 10 in this regard as including one or more multi-granular precoding units 18a, 18b respectively configured to perform precoding for one or more simultaneously transmitted information streams (i.e., layers) 20a, 20b.

When more than one information stream 20a, 20b is transmitted (i.e., the transmission 16 is a multi-stream transmission), the precoded information streams 22a, 22b that are output from the multi-granular precoding units 18a, 18b and that are destined for transmission from the same antenna element 14 are combined with adder 24 and sent to the destination antenna element 14. In at least some multi-stream embodiments, the transmitting node 50 performs the same precoding for each of the multiple streams 20a, 20b, on a stream by stream basis. That is, the same precoder(s) are used to precode each stream 20a, 20b. In one embodiment, though, the transmitting node 50 performs a fixed unitary rotation of the streams 20a, 20b (not shown) prior to precoding.

Irrespective of whether the transmission 16 is a single-stream or multi-stream transmission, the transmitting node 10 according to embodiments herein advantageously precodes the transmission 16 at multiple different levels of granularity (i.e., resolution) in the array's given spatial dimension. Multi-granular precoding in this regard involves precoding the transmission 16 at a coarse level of granularity, as well as at one or more progressively finer levels of granularity. As described more fully below, coarse-granularity precoding forms virtual transmit beams that have a coarse granularity in the array's given spatial dimension, while finer-granularity precoding forms transmit beams that have a finer granularity within the array's given spatial dimension and that are bounded by the virtual transmit beams' envelope.

The transmitting node 10 uses one or more codebooks 26, e.g., stored in memory 28, for performing this multi-granular precoding. As shown in FIG. 1B, the codebook(s) 26 in some embodiments include both a coarse-granularity codebook $C_c$ of different possible coarse-granularity precoders $X_c$ as well as one or more finer-granularity codebooks $C_f$ of different possible finer-granularity precoders $X_f$. Each coarse-granularity precoder $X_c$ targets the given spatial dimension of the array 12 at a coarse level of granularity, whereas each finer-granularity precoder $X_f$ targets the given spatial dimension at a finer level of granularity. As shown in FIG. 1C, the codebook(s) 26 alternatively or additionally include a multi-granularity codebook $C_{mg}$ of different possible multi-granular precoders $X_{mg}$. Each multi-granular precoder $X_{mg}$ targets the given spatial dimension of the array 12 at different granularities. Each multi-granular precoder $X_{mg}$ in this regard factorizes into a coarse-granularity precoder $X_c$ and one or more finer-granularity precoders $X_f$. In some embodiments, for example, each multi-granular precoder $X_{mg}$ is formed as the Kronecker Product of a coarse-granularity precoder $X_c$ and one or more finer-granularity precoders $X_f$ respectively associated with one or more finer levels of granularity, e.g., $X_{mg} = X_f \otimes X_c$, where $\otimes$ represents the Kronecker Product. In any event, by way of its factorized structure, a multi-granular precoder $X_{mg}$ represents a certain combination of a coarse-granularity precoder $X_c$ and one or more finer-granularity precoders $X_f$. Accordingly, separate application of precoders $X_c$, $X_f$ from the coarse and finer granularity codebooks $C_c$, $C_f$ is equivalent to application of a corresponding precoder $X_{mg}$ from the multi-granular codebook $C_{mg}$.

Figure 1D:
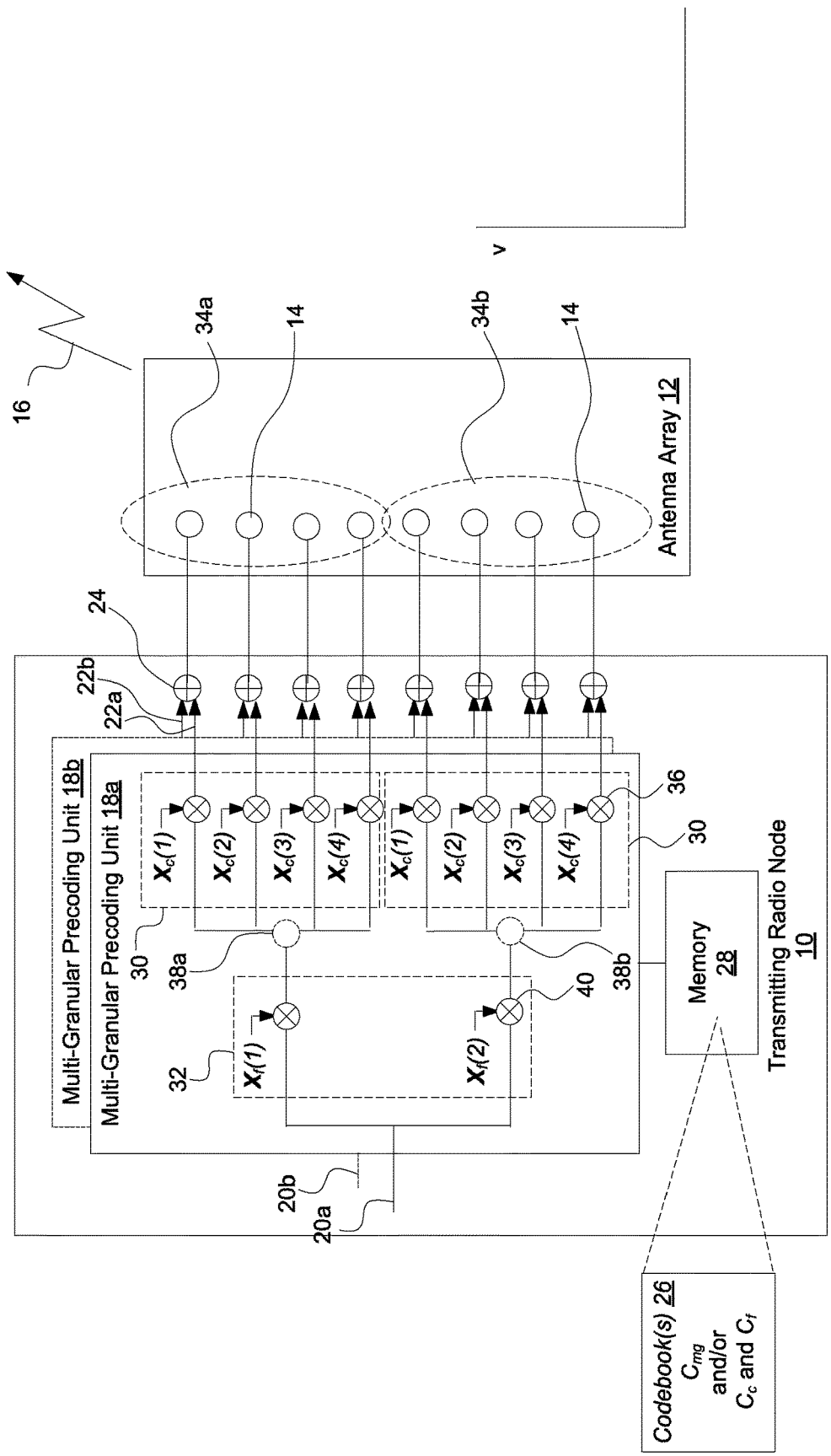
FIG. 1D is a block diagram of a transmitting radio node with additional details regarding how to precode the transmission according to one or more embodiments.

Regardless of the number or type of codebooks 26 employed, FIG. 1A shows that each of the transmitting node's multi-granular precoding units 18a, 18b is configured with different coarse-granularity precoding units 30 as well as one or more finer-granularity precoding units 32 for performing multi-granular precoding for a respective one of the one or more information streams 20a, 20b. The different coarse-granularity precoding units 30 respectively precode the transmission 16 from different subarrays 34a and 34b of the antenna elements 14 using respective coarse-granularity precoders $X_c$. Referring briefly to FIG. 1D, for example, these coarse-granularity precoders $X_c$ are identical 4x1 precoding vectors applied via multipliers 36 such that the first entry $X_c(1)$ weights the transmission from the topmost antenna element 14 in each subarray 34a, 34b, the second entry $X_c(2)$ weights the transmission from the second antenna element 14 in each subarray 34a, 34b, the third entry $X_c(3)$ weights the transmission from the third antenna element 14 in each subarray 34a, 34b, and the fourth entry $X_c(4)$ weights the transmission from the bottommost antenna element 14 in each subarray 34a, 34b. Irrespective of the particular composition of these coarse-granularity precoders $X_c$, though, precoding the transmission 16 in this way virtualizes the subarrays 34a and 34b as different respective "auxiliary" elements 38a and 38b. That is, the coarse-granularity precoding virtualizes together the antenna elements 14 within subarray 34a, and virtualizes together the antenna elements 14 within subarray 34b, so that the antenna elements 14 effectively appear as a fewer number of auxiliary elements 38a and 38b.

The finer-granularity precoding unit 32 precodes the transmission from these different auxiliary elements 38a and 38b using one or more finer-granularity precoders $X_f$. As shown in FIG. 1D, for example, a single finer-granularity precoder $X_f$ constituting a 2x1 precoding vector is applied via multipliers 40 such that the first entry $X_f(1)$ weights the transmission from the topmost auxiliary element 38a, and thereby each antenna element 14 within subarray 34a. And the second entry $X_f(2)$ weights the transmission from the bottommost auxiliary element 38b, and thereby each antenna element 14 within subarray 34b. In at least some embodiments, for instance, this means the auxiliary elements 38a, 38b, which now will have a certain beamforming pattern formed by the virtualization $X_c$, are virtualized by the precoder $X_f$ so as to produce the final beamforming pattern. That is, $X_c$ creates the shape of the auxiliary elements 38a, 38b and $X_f$ creates a narrower beam within the beam pattern of the auxiliary elements 38a, 38b.

FIGS. 2A-2E help visualize the granular nature of this precoding approach by illustrating the different transmit beams realizable from exemplary codebook(s) 26. In this example, the transmitter 10 is configured to precode the transmission from the two four-element subarrays 34a, 34b in FIG. 1A with the same coarse-granularity precoder $X_c$ constituting a 4x1 Discrete Fourier Transform (DFT) vector, and to precode the transmission from the two resulting auxiliary elements 38a, 38b with a single finer-granularity precoder $X_f$ constituting a 2x1 DFT precoding vector.

Figure 2A:
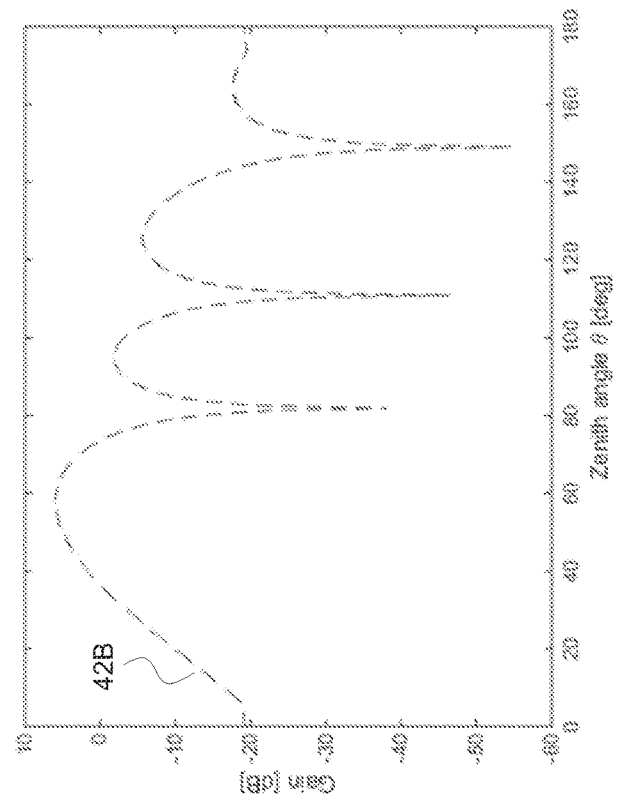
FIGS. 2A-2E are plots illustrating the transmit beams possible according to precoding herein.
Figure 2B:
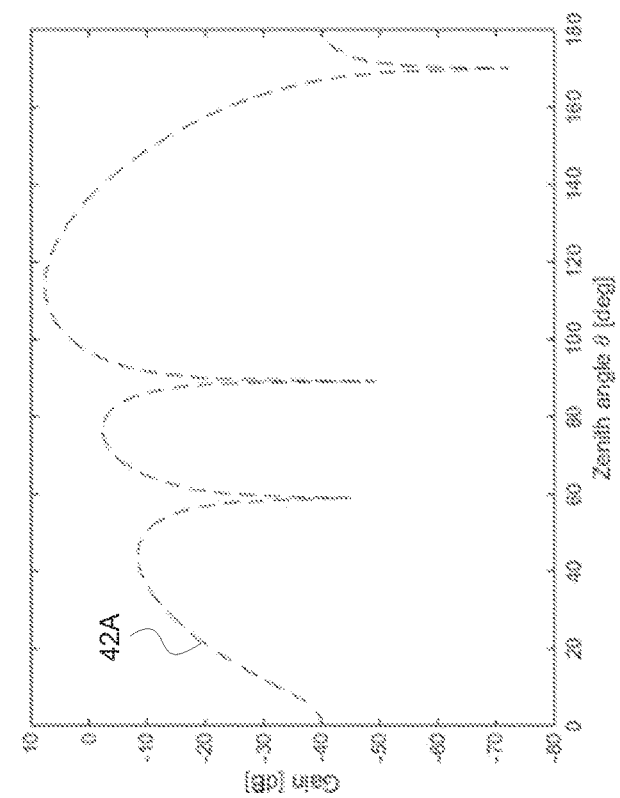

FIGS. 2A and 2B show two different patterns of virtual transmit beams 42A, 42B that are coarse in granularity with respect to the zenith angle they cover. These two different patterns of virtual transmit beams 42A, 42B are realizable from precoding the transmission from each subarray 34a, 34b with two different possible coarse-granularity precoders $X_c$. That is, FIG. 2A shows that selection of one precoder $X_c$ from $C_c$ (or a corresponding precoder $X_{mg}$ from $C_{mg}$) forms one pattern of virtual beams 42A, whereas FIG. 2B shows that selection of a different precoder $X_c$ from $C_c$ (or a corresponding precoder $X_{mg}$ from $C_{mg}$) forms a different pattern of virtual beams 42B.

Figure 2D:
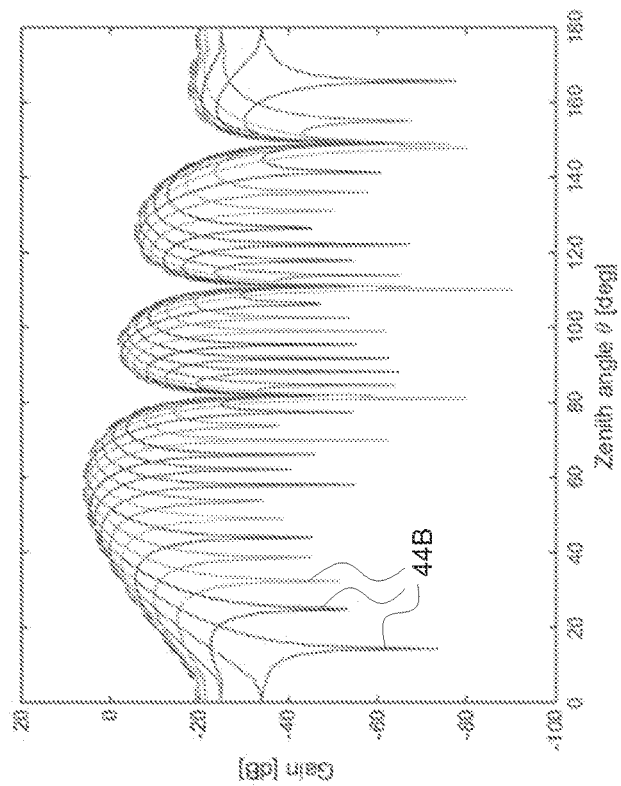
Figure 2C:
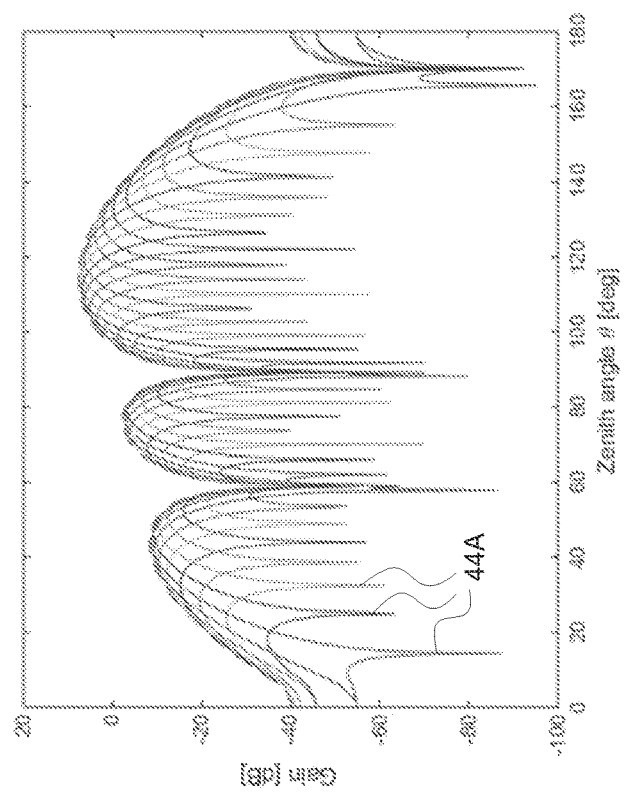
Figure 2E:
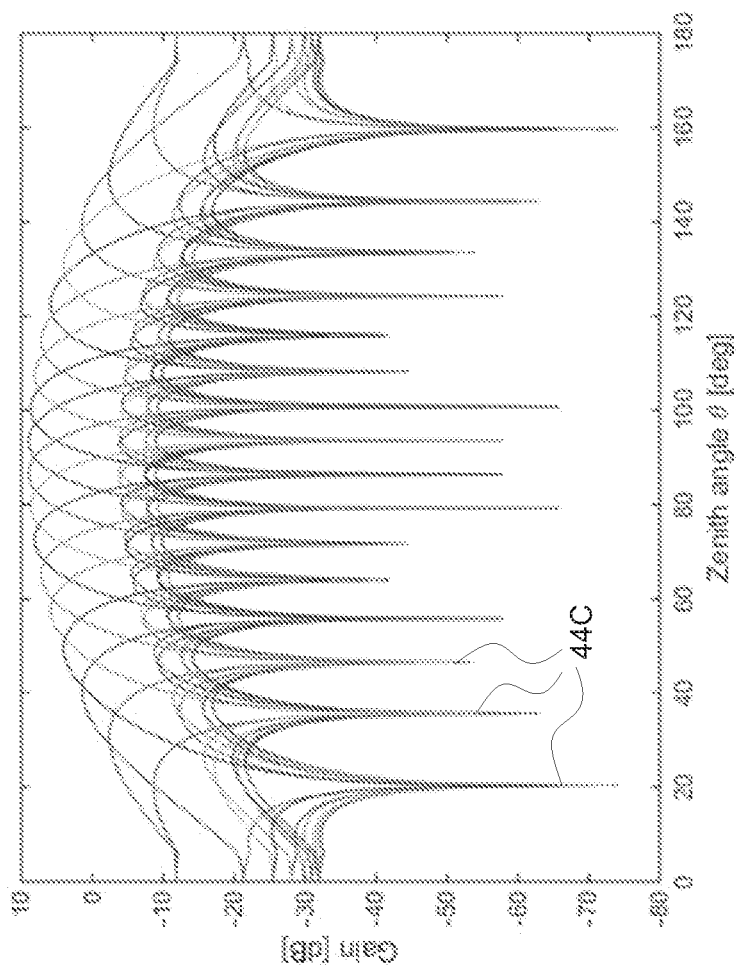

FIGS. 2C and 2D show different possible transmit beams 44A, 44B that are finer in granularity with respect to the zenith angle they cover (as compared to the coarse beams 42A, 42B). These different possible finer-granularity transmit beams 44A, 44B are realizable from precoding the transmission from the auxiliary elements 38a, 38b with different possible finer-granularity precoders $X_f$. Finer-granularity transmit beams 44A have amplitudes bounded by the envelope of the virtual transmit beams 42A formed in FIG. 2A, whereas finer-granularity transmit beams 44B have amplitudes bounded by the envelope of the virtual transmit beams 42B formed in FIG. 2B. Accordingly, by selecting different combinations of precoders from $C_c$ and $C_f$, or by selecting different precoders from $C_{mg}$, the transmitter 10 in some embodiments effectively controls both the transmit beam direction and the transmit beam amplitude. This contrasts with conventional precoding whereby a transmitter can only control the transmit beam direction, by selecting between different transmit beams 44C like those shown in FIG. 2E.

Some embodiments exploit multi-granular precoding herein to reduce the amount of transmission resources needed for reference signal transmission and thereby reduce precoding overhead. Consider for example embodiments illustrated by FIG. 3.

Figure 3:
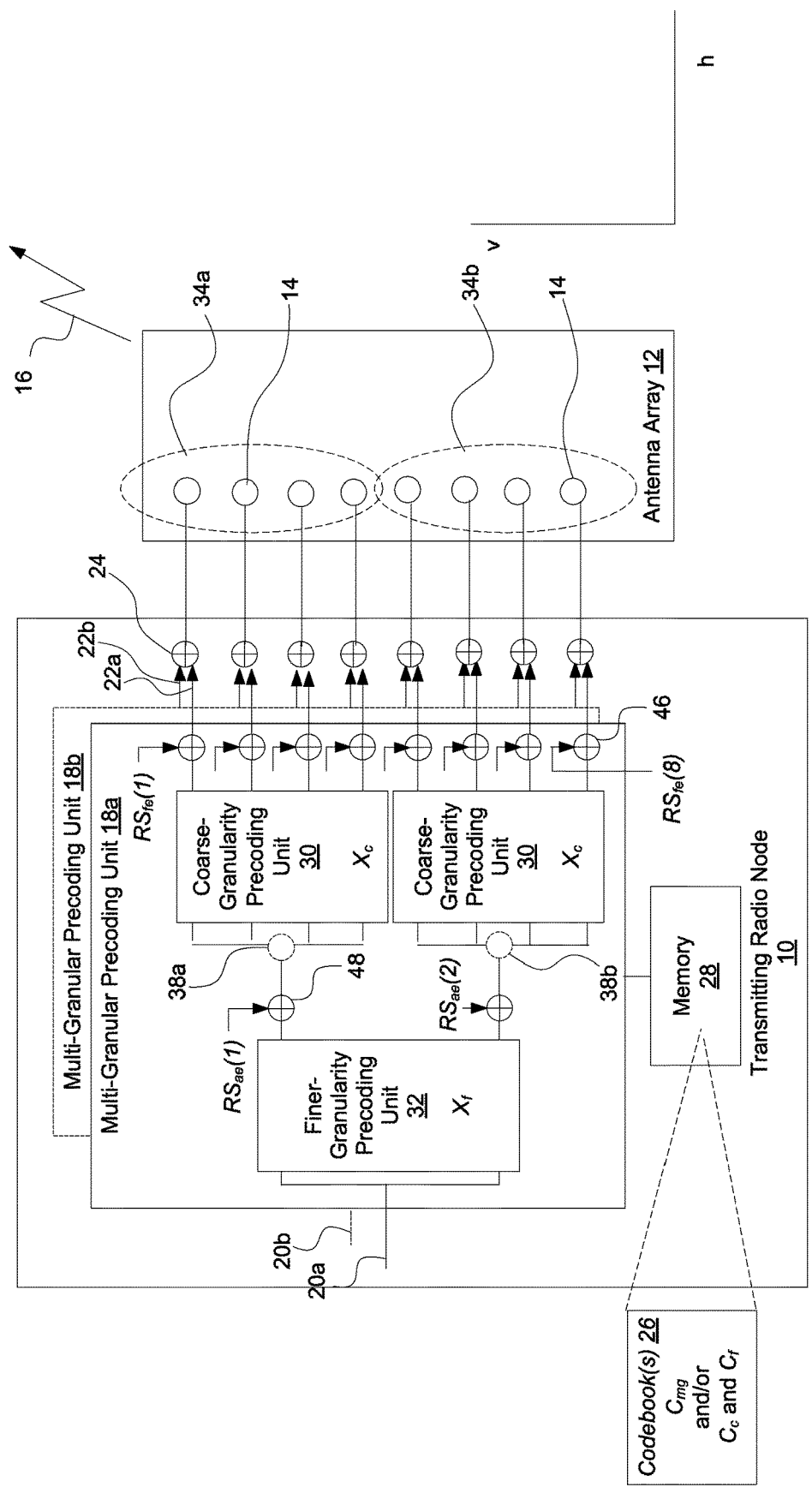
FIG. 3 is a block diagram of a transmitting radio node configured to transmit reference signals according to one or more embodiments.

As shown in FIG. 3, the transmitting node 10 transmits a full-elements reference signal $RS_{fe}$ from the antenna elements 14 without precoding. This reference signal $RS_{fe}$ is "full-elements" therefore in the sense that it may correspond to all available antenna elements 14. In at least some embodiments, the transmitting node 10 does so by adding the full-elements reference signal $RS_{fe}$ to the already-precoded transmit signal via adders 46. Specifically, the reference signal's first symbol $RS_{fe}(1)$ is added to the precoded transmission from the top-most antenna element 14, the reference signal's second symbol $RS_{fe}(2)$ is added to the second-topmost antenna element 14, and so on. In at least some embodiments, the full-elements reference signal $RS_{fe}$ is mapped to different transmission resources (e.g., time-frequency resource elements in LTE) than the precoded transmission.

The transmitting node 10 also notably transmits a so-called auxiliary-elements reference signal $RS_{ae}$ from the different subarrays 34a, 34b using respective coarse-granularity precoders $X_c$ that are factorizable from a multi-granular precoder $X_{mg}$ targeting the given spatial dimension of the array 12 at different granularities, so as to virtualize the subarrays 34a, 34b as the different auxiliary elements 38a, 38b. In at least some embodiments, the transmitting node 10 does so by adding the auxiliary-elements reference signal $RS_{ae}$ to the fine-grained precoded transmit signal via adders 48. Specifically, the reference signal's first symbol $RS_{ae}(1)$ is added to the precoded transmission from the top auxiliary element 38a, and the reference signal's second symbol $RS_{ae}(2)$ is added to the bottom auxiliary element 38b. The transmitting node 10 transmits this precoded, auxiliary-elements reference signal $RS_{ae}$ to the receiving radio node.

In fact, in at least some embodiments, the full-elements and auxiliary-elements reference signals are common reference signals transmitted from the antenna array 12 to multiple receiving radio nodes. In LTE embodiments, for example, the full-elements and auxiliary-elements reference signals may be channel state information reference signals (CSI-RS) or cell-specific reference signals (CRS). In this case, therefore, the auxiliary-elements reference signal $RS_{ae}$ differs from conventional common reference signals in that the auxiliary-elements reference signal $RS_{ae}$ is precoded, even though it is a common reference signal.

In any event, some embodiments herein reduce reference signal overhead by transmitting the precoded, auxiliary-elements reference signal more often than transmitting the full-elements reference signal. And the transmitting node 10 configures transmission of the auxiliary-elements reference signal based on information obtained from prior transmission of the full-elements reference signal. Specifically, the transmitting node 10 determines a coarse-granularity precoder $X_c$ based on feedback received responsive to transmission of the full-elements reference signal, and uses that coarse-granularity precoder $X_c$ as a fixed virtualization on the antenna array 12 for transmission of the auxiliary-elements reference signal. That is, the transmitting node 10 effectively uses the full-elements reference signal to fix the virtual, coarse transmit beams over multiple transmissions of the auxiliary-elements reference signal, and uses the auxiliary-elements reference signal (which has a lower overhead than the full-elements reference signal) to form fine-grained transmit beams.

For example, in one embodiment, the transmitting node 10 transmits the full-elements reference signal at time instant 1, and transmits the auxiliary-elements reference signal at time instants 2, 3, 4, and 5. In doing so, the transmitting node 10 determines a coarse-granularity precoder $X_c$ based on feedback received from transmission of the full-elements reference signal at time instant 1, and then to use that same coarse-granularity precoder $X_c$ for precoding the transmission of the auxiliary-elements reference signal at time instants 2, 3, 4, and 5. The transmitting node 10 repeats this transmission pattern for future time instants. Hence, by transmitting the full-elements reference signal with lower periodicity than the auxiliary-elements reference signal, the amount of transmission resources required for reference signal transmission is reduced as compared to transmitting a full-elements reference signal at time instants 1, 2, 3, 4, and 5.

In yet other embodiments, the transmitting node 10 interlaces the precoded, auxiliary-elements reference signal with the full-elements reference signal in time. For example, the transmitting node 10 transmits the full-elements reference signal at time instant 1 and the auxiliary-elements reference signal at time instant 2, and repeats this pattern. Again, the transmitting node 10 configures transmission of the auxiliary-elements reference signal based on information obtained from prior transmission of the full-elements reference signal.

According to one approach, the transmitting node 10 actually re-configures coarse-granularity precoding of the auxiliary-elements reference signal based on the coarse-granularity precoder $X_c$ obtained from prior transmission of the full-elements reference signal. In another approach, by contrast, the transmitting node 10 configures a set of multiple different auxiliary-elements reference signals that respectively correspond to different possible coarse-granularity precoders $X_c$. The transmitting node 10 determines a coarse-granularity precoder $X_c$ based on feedback from transmission of the full-elements reference signal, and then dynamically allocates to the receiving node the auxiliary-elements reference signal that corresponds to that coarse-granularity precoder $X_c$.

In addition to lowering reference signal overhead, embodiments herein also increase the resulting quality of the channel estimates performed by the receiving node. Indeed, in at least some embodiments, the auxiliary-elements reference signal is beamformed using the virtualization from coarse-granularity precoding, resulting in a beamforming gain, e.g., of $10 \log_{10}(N_c)$, where $N_c$ is the number of antenna elements virtualized by coarse-granularity precoding. This will increase the signal-to-interference-plus-noise (SINR) on the transmission resources (e.g., resource elements in LTE) of the auxiliary-elements reference signal, and lead to increased channel estimation quality. This will in turn lead to less link adaptation errors and increased system performance.

Figure 4:
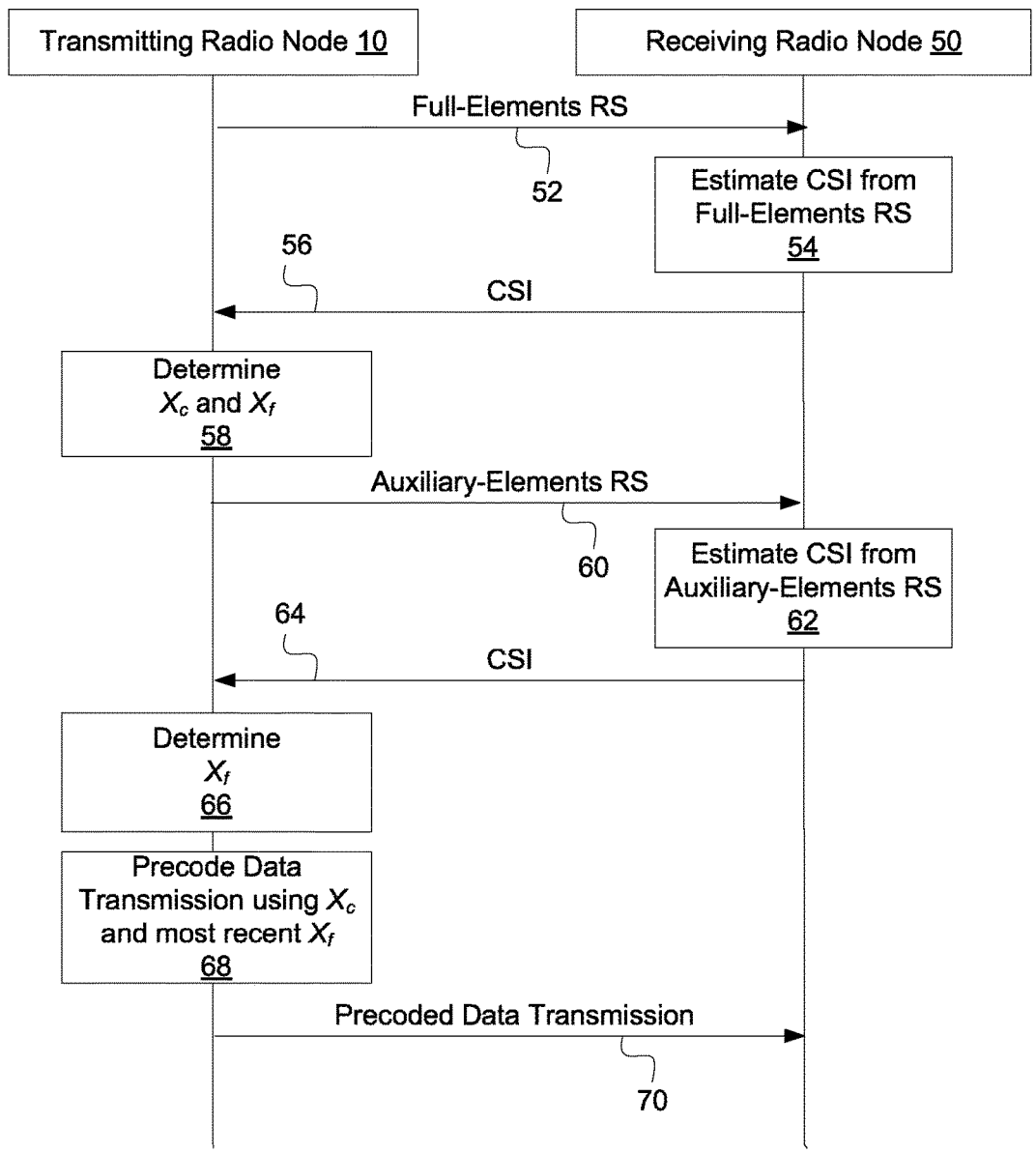
FIG. 4 is a logic flow diagram of interaction between a transmitting radio node and a receiving radio node, for reducing reference signal transmission overhead, according to one or more embodiments.

With these possible variations in mind, FIG. 4 illustrates interaction between the transmitting node 10 and a receiving radio node 50 for reducing reference signal overhead according to some embodiments. As shown, the transmitting node 10 transmits a full-elements reference signal (RS) 52 from the antenna elements 14 without precoding (Step 52). The receiving node 50 estimates channel state information (CSI) from this full-elements RS (Step 54). In at least some embodiments, the receiving node 50 does so based on the multi-granular codebook $C_{mg}$, or a combination of the coarse-granularity codebook $C_c$ and the one or more finer-granularity codebooks $C_f$, so as to apply multiple granularity levels. The receiving node 50 then reports the estimated CSI to the transmitting node 10 (Step 56). The CSI may include for instance an indicator (e.g., a precoding matrix index, PMI) for a recommended multi-granular precoder $X_{mg}$, or a recommended combination of a coarse-granularity precoder $X_c$ and a finer-granularity precoder $X_f$. The transmitting node 10 determines a coarse-granularity precoder $X_c$ and a finer-granularity precoder $X_f$ based on the receiving node's recommendation (Step 58).

Using this determined coarse-granularity precoder $X_c$, the transmitting node 10 transmits an auxiliary-elements reference signal (Step 60). That is, the auxiliary-elements reference signal is virtualized based on the coarse granularity level of the recommended precoder. The receiving node 50 estimates CSI from this auxiliary-elements RS (Step 62). The receiving node 50 does so based on the finer-granularity codebook $C_f$; that is, the receiving node 50 applies the one or more finer-granularity levels. The receiving node 50 then reports the estimated CSI to the transmitting node 10 (Step 64). The CSI may include for instance an indicator (e.g., PMI) for a recommended finer-granularity precoder $X_f$. The transmitting node 10 determines a finer-granularity precoder $X_f$ based on the receiving node's recommendation (Step 66).

The transmitting node 10 next precodes a data transmission, e.g., as described in FIGS. 1A-1D, using the coarse-granularity precoder $X_c$ determined in Step 56 and the finer-granularity precoder $X_f$ determined in Step 66. That is, the transmitting node 10 disregards the finer-granularity precoder $X_f$ determined from the full-elements RS, in favor of the finer-granularity precoder $X_f$ that was more recently determined from the auxiliary-elements RS with lower overhead. Finally, the transmitting node 10 transmits this precoded data transmission to the receiving node 50 (Step 70).

The above example with reference to FIG. 4 illustrates certain embodiments herein whereby the transmitting node 10 receives a "complete" recommendation and a "partial" recommendation from the receiving node 50 at different times. In particular, the transmitting node 10 receives a complete recommendation in Step 56 by receiving a recommendation for both a coarse-granularity and a finer-granularity precoder. This recommendation may comprise for example either (i) an indicator (e.g., PMI) for a multi-granular precoder in the multi-granular codebook; or (ii) an indicator (e.g., PMI) for a coarse-granularity precoder in the coarse-granularity codebook and one or more indicators (e.g., PMIs) for one or more finer-granularity precoders in the one or more finer-granularity codebooks. No matter its form, though, the recommendation is complete in the sense that it reflects each of the different levels of granularity. By contrast, the transmitting node 10 later receives a partial recommendation in Step 64 by receiving a recommendation for only one or more finer-granularity precoders (i.e., the recommendation does not reflect the coarse-granularity level).

Armed with these recommendations, the transmitting node 10 precodes the data transmission using both a coarse-granularity precoder from the complete recommendation as well as one or more finer-granularity precoders from the partial recommendation. The transmitting node 10 does so by basing its ultimate precoder selection on (i.e., considering) the precoders recommended by the complete and partial recommendations. In at least some embodiments, though, the transmitting node 10 is permitted to consider, but not necessarily follow, these recommendations.

In at least some embodiments alluded to above, the transmitting node 10 receives a partial recommendation more often than receiving a complete recommendation. These embodiments follow from the embodiments that transmit an auxiliary-elements reference signal more often than transmitting a full-elements reference signal.

With this in mind, other embodiments herein alternatively or additionally exploit multi-granular precoding to reduce the amount of transmission resources needed for transmitting CSI feedback and/or reduce the computational complexity required to determine the CSI to feed back. Consider for example embodiments illustrated by FIG. 5.

Figure 5:
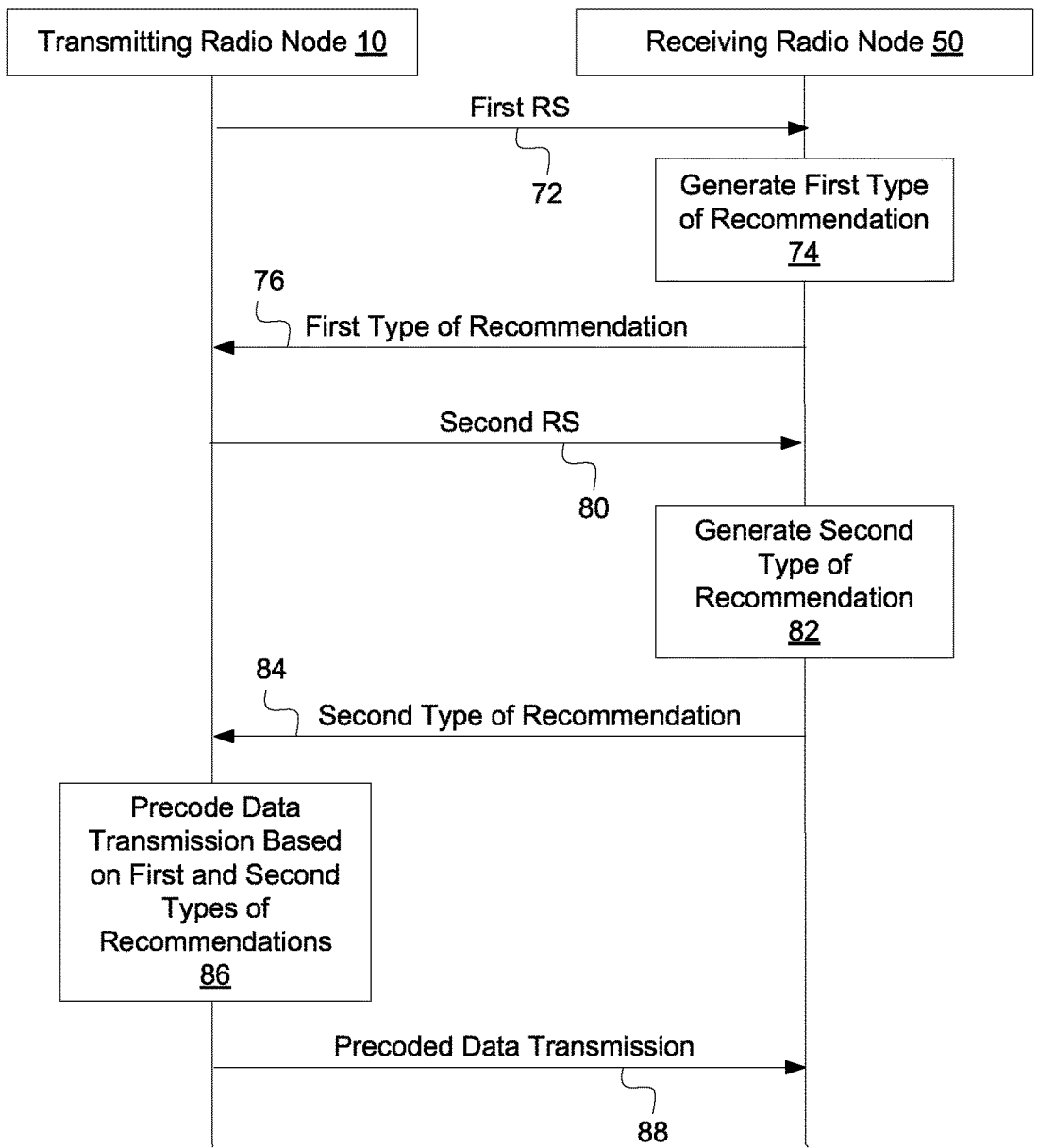
FIG. 5 is a logic flow diagram of interaction between a transmitting radio node and a receiving radio node herein, for reducing CSI feedback transmission overhead and/or CSI feedback computational complexity according to one or more embodiments.

As shown in FIG. 5, the receiving node 50 receives a first reference signal transmitted from the antenna array 12 (Step 72). Based on measurement of the first reference signal, the receiving node 50 generates a first type of recommendation that recommends either a multi-granular precoder $X_{mg}$, or a coarse-granularity precoder $X_c$ and one or more finer-granularity precoders $X_f$, the combination of which corresponds to a multi-granular precoder (Step 74). This first type of recommendation may therefore be characterized as a complete recommendation according to some embodiments. In any event, the receiving node 50 transmits this first type of recommendation to the transmitting node 10 (Step 76).

The receiving node 50 also receives a second reference signal transmitted from the antenna array 12 (Step 78). Based on measurement of this second reference signal, the receiving node 50 generates a second type of recommendation that recommends one or more finer-granularity precoders $X_f$ (Step 80). As explained below, this second type of recommendation may be characterized as either a complete recommendation or a partial recommendation. Irrespective of its particular form, though, the receiving node transmits this second type of recommendation to the transmitting node 10 (Step 82).

Finally, the receiving node 50 receives from the antenna array 12 a data transmission that is precoded, e.g., as described in FIGS. 1A-1D, based on the first and second types of recommendations (Step 84).

In at least some embodiments, as suggested above, the first reference signal is a full-elements reference signal transmitted from the antenna elements 14 without precoding, and the second reference signal is an auxiliary-elements reference signal transmitted from the different subarrays 34a, 34b of antenna elements 14 using respective coarse-granularity precoders. In this case, the second type of recommendation exclusively recommends one or more finer-granularity precoders, without also recommending a coarse-granularity precoder; that is, the second type of recommendation is a partial recommendation. In at least some embodiments, the auxiliary-elements reference signal is dedicated to the receiving node 50 (e.g., a demodulation reference signal, DMRS, in LTE). In other embodiments, the auxiliary-elements reference signal is a common reference signal transmitted from the antenna array 12 to multiple receiving nodes (e.g., a CRS in LTE). In these latter embodiments, the receiving node 50 decodes the precoded transmission of the auxiliary-elements reference signal using the respective coarse-granularity precoders. Regardless, these embodiments correspond to the embodiments illustrated in FIG. 4, from the perspective of the receiving node 50.

In embodiments such as this, the receiving node 50 may also receive the precoded, auxiliary-elements reference signal more often than receiving the full-elements reference signal. Alternatively, the receiving node 50 may receive the precoded, auxiliary-elements reference signal interlaced with the full-elements reference signal in time.

In any event, the receiving node 50 in one or more of these and other embodiments transmits the second type of recommendation to the transmitting node 10 more often than transmitting the first type of recommendation to the transmitting node 10. For example, the receiving node 50 may transmit the first type of recommendation at time instant 1, and transmit the second type of recommendation at time instants 2, 3, 4, and 5, e.g., based on constraining the precoders to use the last available coarse-granularity precoder from time instant 1. Hence, only a finer-granularity precoder is derived. Regardless, where the second type of recommendation exclusively recommends one or more finer-granularity precoders, not the coarse-granularity precoder, this reduces the amount of transmission resources needed for transmitting CSI feedback. Accordingly, in embodiments where the second reference signal is an auxiliary-elements reference signals transmitted more often than the first reference signal as a full-elements reference signal, transmission resource overhead from both reference signal transmission and CSI feedback is reduced.

Other embodiments, though, reduce the amount of transmission resources needed for transmitting CSI feedback, without necessarily reducing the amount of transmission resources needed for transmitting the reference signals. In these embodiments, contrary to those illustrated in FIG. 4, both the first and second reference signals are full-elements reference signals transmitted from the antenna elements 14 without precoding. No overhead reduction is achieved therefore from transmission of an auxiliary-elements reference signal. But the receiving node 50 generates the second type of recommendation to exclusively recommend one or more finer-granularity precoders, without also recommending a coarse-granularity precoder. Accordingly, although the receiving node 50 recommends a coarse-granularity precoder based on measurement of a full-elements reference signal in Step 76, the receiving node 50 does not recommend a coarse-granularity precoder based on measurement of the other full-elements reference signal in Step 84. That is, the first type of recommendation in this case amounts to a complete recommendation described above, whereas the second type of recommendations amounts to a partial recommendation described above. This approach thereby saves transmission resource overhead due to CSI feedback, since no feedback needs to be sent regarding a coarse-granularity precoder in the partial recommendation at Step 84. Instead, the transmitting node 10 will precode the transmission in Step 86 based on the most recently recommended coarse-granularity precoder, e.g., as recommended in Step 76.

In at least some embodiments, this approach also reduces the computational complexity required by the receiving node 50 to determine the CSI to feed back to the transmitting node 10. Indeed, when generating the second type of recommendation as a partial recommendation, the receiving node 50 does not need to determine which coarse-granularity precoder to recommend to the transmitting node 10. Rather, the receiving node 50 just needs to concern itself with recommending one or more finer-granularity precoders.

Still other embodiments reduce the computational complexity required by the receiving node 50 to determine the CSI to feed back to the transmitting node 10, without reducing the amount of transmission resources needed for transmitting reference signals or CSI feedback. In these embodiments, again, both the first and second reference signals are full-elements reference signals transmitted from the antenna elements 14 without precoding. No overhead reduction is achieved therefore from transmission of an auxiliary-elements reference signal. Furthermore, the receiving node 50 generates the second type of recommendation to recommend either a multi-granular precoder in the multi-granular codebook or a coarse-granularity precoder in the coarse-granularity codebook and one or more finer-granularity precoders in one or more finer-granularity codebooks. That is, the receiving node 50 generates both the first and second types of recommendations as complete recommendations, meaning that these embodiments do not reduce the amount of transmission resources required for sending the CSI feedback to the transmitting node 10.

However, the receiving node 50 generates the second type of recommendation in a way that requires less computational complexity than that required to generate the first type of recommendation. First, the receiving node 50 refrains from re-evaluating which coarse-granularity precoder to recommend. Instead, the receiving node 50 simply recommends the same coarse-granularity precoder from (i.e., reflected by) a first type of recommendation (generated in Step 74). This effectively reduces the receiving node's precoder search space and thereby advantageously reduces computational complexity.

Still other embodiments herein additionally or alternatively exploit multi-granular precoding in order to adapt the precoding codebook(s) 26 to different propagation environments. Consider for instance the embodiments illustrated by FIG. 6, which do so using codebook subset restriction.

Figure 6:
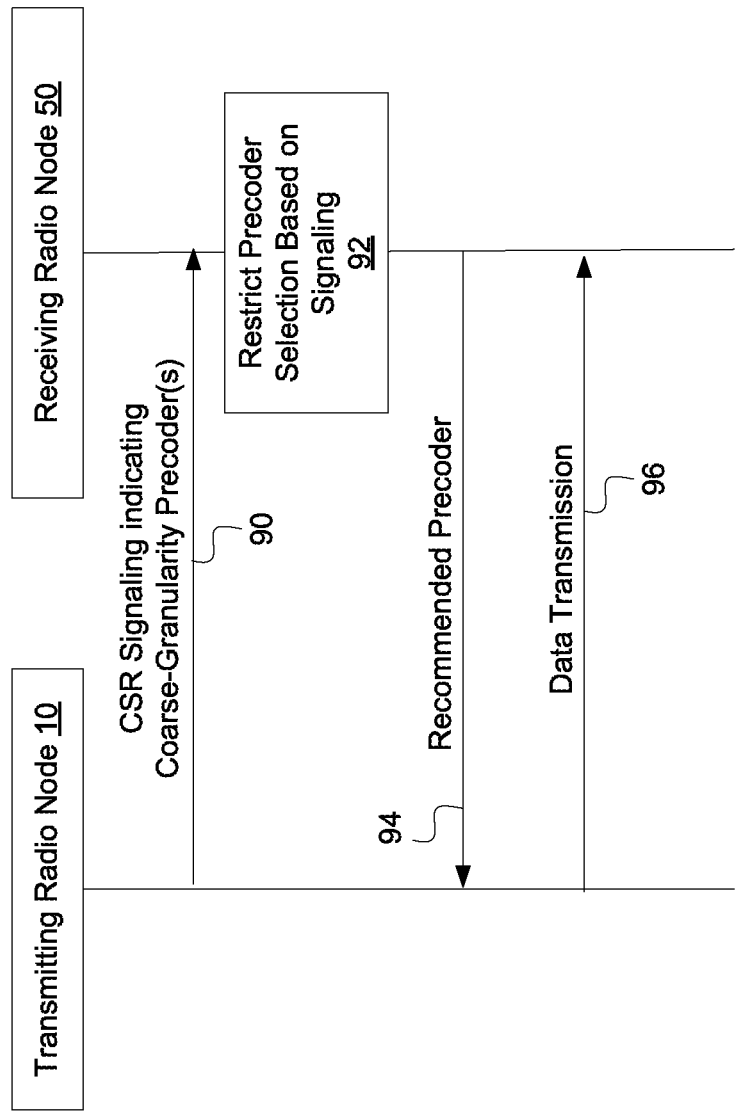
FIG. 6 is a logic flow diagram of interaction between a transmitting radio node and a receiving radio node herein, for codebook subset restriction according to one or more embodiments.

As shown in FIG. 6, the transmitting node 10 configures the receiving node 50 to restrict precoders from which the receiving node 50 selects, for recommending to the transmitting node 10, to a certain subset of precoders. The receiving node 50 therefore cannot recommend any other precoder. This subset to which selection is restricted includes those precoders in a codebook 26 (e.g., $C_c$ or $C_{mg}$) that correspond to one or more indicated coarse-granularity precoders. The transmitting node 10 does this by transmitting codebook subset restriction (CSR) signaling to the receiving node 50 indicating those one or more coarse-granularity precoders to which selection is restricted (Step 90).

For example, where the receiving node 50 selects from a coarse-granularity codebook $C_c$, the signaling indicates different coarse-granularity precoders $X_c$ in that codebook $C_c$ from which the receiving node 50 is permitted to select. As another example, where the receiving node 50 selects from a multi-granular codebook $C_{mg}$, the signaling indicates different coarse-granularity precoders $X_c$ into which a multi-granular precoder $X_{mg}$ selected from the codebook $C_{mg}$ must factorize. That is, each multi-granular precoder $X_{mg}$ in the subset to which the receiving node 50 is restricted to must factorize into (i.e., correspond to) any of the coarse-granularity precoders $X_c$ indicated by the signaling.

In any event, based on this signaling, the receiving node 50 restricts precoders from which the receiving node 50 selects for recommending to the transmitting node 10 to the subset of precoders in a codebook 26 that corresponds to the one or more indicated coarse-granularity precoders (Step 92). The receiving node 50 then transmits to the transmitting node 10 a recommended precoder selected according to that restriction (Step 94). Finally, the receiving node 50 receives from the antenna array 12 a data transmission that is precoded based on the recommended precoder (Step 96). The transmitting node 10 in this regard may consider, but not necessarily follow, the receiving node's recommendation.

Because a coarse-granularity precoder defines an upper mask on the potential radiated power pattern from the transmitting node 10, restricting codebook selection at this coarse level of granularity effectively controls how much power is radiated from the transmitting node 10 in different directions. The transmitting node 10 in at least some embodiments therefore chooses the coarse-granularity precoders that restrict precoder selection, in order to dynamically control the direction and amount of power radiated by the transmitting node 10. This is thus an efficient way to adapt the codebook(s) 26 to a certain propagation environment. Indeed, the transmitting node 10 may prohibit the receiving node 50 from selecting or recommending certain precoders that generate harmful interference in certain directions.

In general, therefore, the codebook(s) 26 herein do not necessarily maximize the expected SNR for a receiving node as is conventional; rather, the codebook(s) 26 include precoders that have certain properties that can be used in other ways to increase system performance.

Alternatively or additionally, codebook subset restriction signaling defined at a coarse level of granularity advantageously lowers the amount of transmission resources required for such signaling. For example, signaling a certain subset of multi-granular precoders to which selection shall be restricted requires fewer transmission resources when done by signaling indices for corresponding coarse-granularity precoders (rather than by signaling a greater number of indices for those multi-granular precoders themselves).

Regardless, note that the above codebook subset restriction signaling embodiments comport well with embodiments that employ a full-elements reference signal. In this regard, the receiving node 50 in at least some embodiments is configured to receive a full-elements reference signal transmitted from the antenna elements 14 without precoding. Based on measurement of the full-elements reference signal, the receiving node 50 in one embodiment selects the recommended precoder a multi-granular precoder $X_{mg}$ in a multi-granular codebook $C_{mg}$, from amongst a subset of multi-granular precoders in the codebook that factorize into any of the one or more coarse-granularity precoders indicated by the codebook subset restriction signaling. Alternatively, the receiving node 50 in another embodiment selects the recommended precoder as a coarse-granularity precoder $X_c$ in a coarse-granularity codebook $C_c$, from amongst the one or more coarse-granularity precoders indicated by the codebook subset restriction signaling. The receiving node 50 then transmits this recommendation to the transmitting node 10.

Of course, although various figures herein illustrates multi-granular precoding with an antenna array 12 that has a certain number of antenna elements 14, embodiments herein are equally extendable to arrays with a different number of antenna elements 14.

Also, the given spatial dimension of the antenna array 12 as described herein may be any dimension in the spatial domain, whether horizontal, vertical, or otherwise. This given spatial dimension may be the only dimension that the antenna array 12 has in the spatial domain, such that the antenna array 12 constitutes a so-called one-dimensional (1D) array in the spatial domain. Or, the antenna array 12 may have one or more additional dimensions in the spatial domain, e.g., the antenna array 12 constitutes a 2D or 3D array. In at least some embodiments, the transmission 16 from the antenna array 12 may also be precoded with multiple levels of granularity in at least one of these one or more additional spatial dimensions.

Still further, the antenna array 12 herein may also include additional antenna elements that are spatially aligned with antenna elements 14 and with one another, but that are cross-polarized with elements 14. In at least some embodiments, transmission from these cross-polarized elements proceeds in a like manner as that described above.

Furthermore, note that an antenna element as used herein is non-limiting in the sense that it can refer to any virtualization (e.g., linear mapping) of a transmitted signal to physical antenna elements. For example, groups of physical antenna elements may be fed the same signal, and hence share the same virtualized antenna port when observed at the receiver. Hence, the receiver cannot distinguish and measure the channel from each individual antenna element within the group of elements that are virtualized together. Accordingly, the terms "antenna element", "antenna port" or simply "port" should be considered interchangeable herein, and may refer to either a physical element or port or a virtualized element or port.

Figure 7:
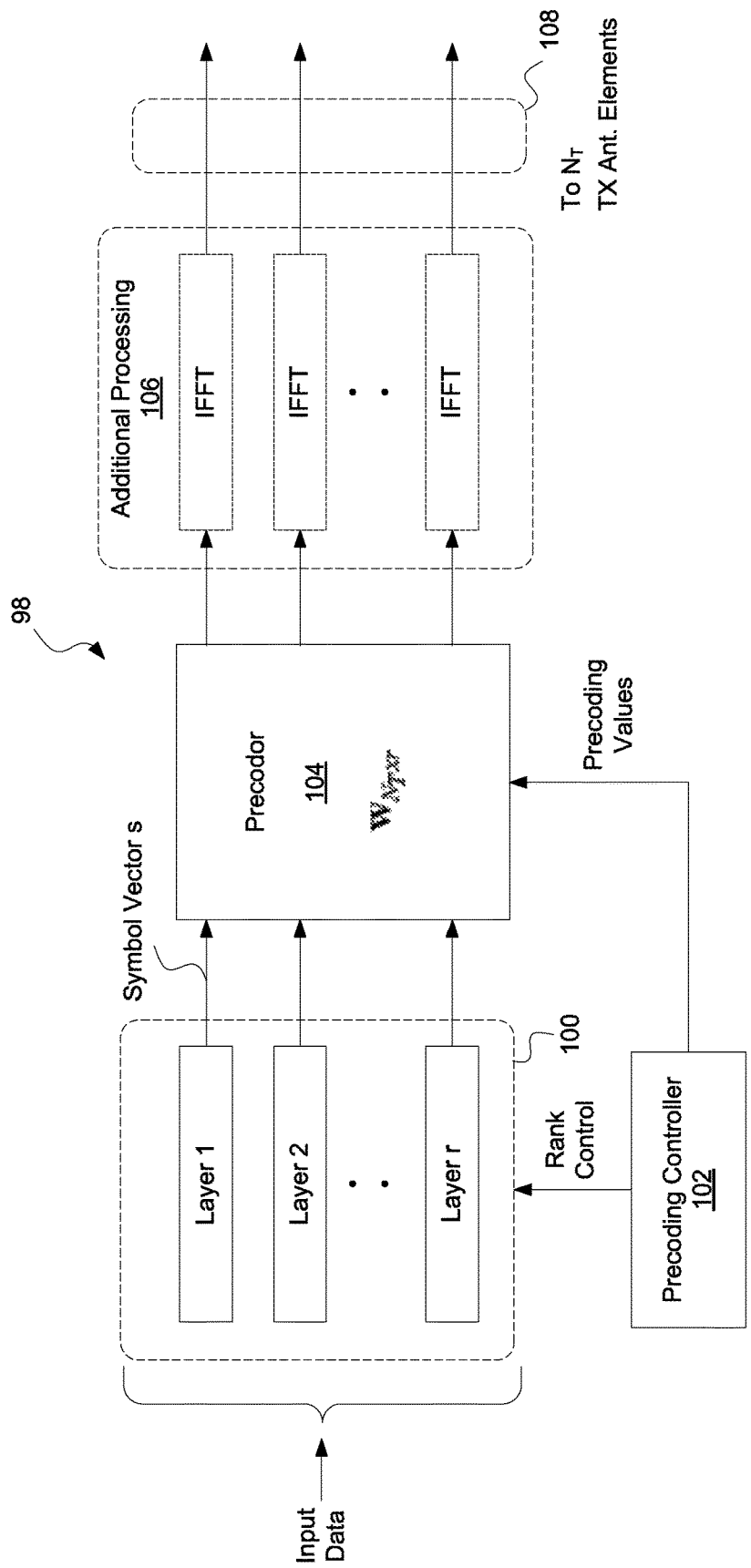
FIG. 7 is a block diagram of overall precoding by the transmitting radio node according to one or more embodiments.

Also note that the precoders herein may form all or just a part of an overall precoder applied to the transmitted signal. FIG. 7 illustrates overall precoding according to at least some of these embodiments.

As shown in FIG. 7, a precoding unit 98 receives input data, e.g., information symbols to be transmitted, and it includes layer processing units 100 that are responsive to a rank control signal from a precoding controller 102. Depending on the transmit rank in use, the input data is placed onto one or more spatial multiplexing layers and the corresponding symbol vector(s) s are input to a precoder 104.

The information carrying symbol vector s is multiplied by an $N_T \times r$ precoder matrix W, which serves to distribute the transmit energy in a subspace of the $N_T$ (corresponding to $N_T$ antenna elements) dimensional vector space. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

In any case, the precoder 104 outputs precoded signals to additional processing 106 that processes the signals before providing them towards a number of antenna elements 108 associated with the antenna array 12. In at least some embodiments, such as for OFDM-based transmission schemes like LTE, this additional processing 106 includes Inverse Fast Fourier Transform (IFFT) processing units. In other exemplary embodiments, such as those based on CDMA, the additional processing 106 involves multiplying the signals with spreading sequences.

One example of embodiments where the precoders herein form just part of the overall precoder W will now be described, first for a one-dimensional antenna array and then for a two-dimensional antenna array as concrete examples.

1D Antenna Array

In general, a factorized precoder structure may be used such that $W=W_1W_2$. In one embodiment, this overall precoder is tailored to a 2N-element 1D antenna array. The first precoder $W_1$ is a wideband precoder targeting long term channel characteristics and the second precoder $W_2$ is a frequency-selective precoder targeting short term channel characteristics/co-phasing between polarizations. A precoder matrix indicator (PMI) for each of the two precoders may be supplied by the receiving node, choosing each precoder from a limited set of available precoders (codebooks). The PMI reporting for each of the two precoders can be configured with different frequency granularity. Note that the labeling of $W_1$ as a wideband precoder and $W_2$ as a frequency-selective precoder merely describes the typical use case of the factorized precoder structure and should be considered as non-limiting.

The wideband precoder $$W_1 = \begin{bmatrix} X & 0 \\ 0 & X \end{bmatrix}$$

in some embodiments has a block diagonal structure targeting a uniform 1D antenna array of N cross-polarized antennas (i.e. the number of antenna elements is 2N). With this structure, the same N×1 precoder X is applied to each of the two polarizations.

In one or more embodiments, the precoder X constitutes a multi-granular precoder $X_{mg}$ as described above. For example, the precoder X in some embodiments is constructed by means of a Kronecker Product between a set of K precoders, including a coarse-granularity precoder $X_c$ and one or more finer-granularity precoders $X_f$. These K precoders in this embodiment are vectors. In one embodiment, for example, the vectors are Discrete Fourier Transform (DFT) vectors. That is, the precoders are DFT-based precoders, implementing a Grid-of-Beams codebook, supplying the receiving node 50 with beams pointing in different directions. The DFT vectors may have entries such that the i:th vector is described as $$X_i^{l_i} = \begin{bmatrix} 1 & e^{j2\pi \frac{1 l_i}{N_i Q_i}} & \dots & e^{j2\pi \frac{(N_i-1)l_i}{N_i Q_i}} \end{bmatrix}^T,$$

$l_i=0, \ldots, N_iQ_i-1$, where is an integer oversampling factor, controlling the number of beams available in the codebook and $N_i$ corresponds to the length of the DFT vector. The total precoder X is created as $X^{(l_1,l_2,\ldots,l_K)}=X_1^{l_1} \otimes X_2^{l_2} \ldots \otimes X_K^{l_K}$ for some $(l_1, l_2, \ldots l_K)$. In one embodiment, $X_K^{l_K}$ is the coarse-granularity precoder $X_c$ described herein, and the remaining precoders $X_i^{l_i}$ for i≠K are progressively finer-grained precoders $X_f$. Regardless, in total there are K vectors and the product of the DFT vectors' lengths equals the number of the antenna elements aligned along the given spatial dimension. That is, the vectors are created such that $N_1N_2 \ldots N_K=N$. This means that $X^{(l_1,l_2,\ldots,l_K)}$ will have length N, which in turn means that $W_1$ corresponds to 2N ports. Note that the associative property holds for Kronecker products; that is, $(A \otimes B) \otimes C = A \otimes (B \otimes C)$, meaning that it is not necessary to specify the prioritization order of the binary Kronecker product operations.

In another embodiment, the vectors $X_i^{l_i}$ are not constrained to have a DFT structure.

The frequency-selective precoder $W_2$ may then, for example, for rank 1 be defined as $$W_2 = \begin{bmatrix} 1 \\ e^{j\omega} \end{bmatrix},$$

where $$\omega = \frac{2\pi p}{P},$$

$p=0, \ldots, P-1$ and $P=4$. In this case, the resultant overall precoder becomes $$W = W_1 W_2 = \begin{bmatrix} X & 0 \\ 0 & X \end{bmatrix} \begin{bmatrix} 1 \\ e^{j\omega} \end{bmatrix} = \begin{bmatrix} X \\ e^{j\omega} X \end{bmatrix}.$$

Note that other approaches to constructing $W_2$ are envisioned herein as well.

In a variation, the wideband precoder is instead $$W_1 = \begin{bmatrix} \tilde{X}^{(l_1,l_2,\ldots,l_K)} & 0 \\ 0 & \tilde{X}^{(l_1,l_2,\ldots,l_K)} \end{bmatrix},$$

where $\tilde{X}^{(l_1,l_2,\ldots,l_K)}=[X^{(l_1,l_2,\ldots,l_K)} \ldots X^{(l_1+N_b-1,l_2,\ldots,l_K)}]$, $l_i=0, \ldots, N_iQ_i-1$. In this case, $\tilde{X}^{(l_1,l_2,\ldots,l_K)}$ is a multi-column matrix where each column corresponds to a precoder from the previously described DFT-based Kronecker codebook.

Note that the example above is merely an illustrative example of how the wideband precoder in this embodiment may be constructed; in this case, by setting the columns of $\tilde{X}^{(l_1,l_2,\ldots,l_K)}$ to be precoders of the Kronecker codebook with adjacent $l_2$-indices. This should not be considered limiting. Rather, in the general case, the wideband precoder may be constructed by setting the columns to any of the precoders of the Kronecker codebook, not just precoders with adjacent $l_2$-indices.

Regardless, $W_2$ may then be extended to be a tall matrix consisting of selection vectors which selects one of the precoders in $\tilde{X}^{(l_1,l_2,\ldots,l_K)}$ (in addition to changing the phase between polarizations in some embodiments), consistent with how $W_2$ is defined for the 8TX codebook in the LTE Rel.12 standard.

Figure 8:
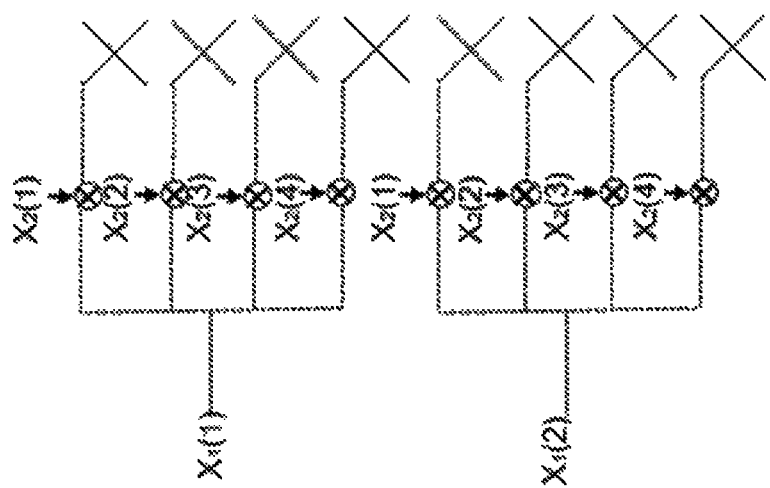
FIG. 8 is a block diagram of multi-granular precoding of a transmission from an 8-element array according to one or more embodiments.

Consider a simple example where the antenna array is a vertical antenna array of cross-polarized antenna elements. In this example, the antenna array is (partly) described by the variables $M_h=1$, $M_v=8$, and $M_p=2$, where $M_h=1$ indicates that the antenna array has only one antenna element in the horizontal dimension, $M_v=8$ indicates that the antenna array has eight antenna elements in the vertical dimension, and $M_p=2$ indicates that the antenna array has two antenna elements in the polarization (non-spatial) dimension. The total number of antenna elements is thus $M=M_hM_vM_p=16$. In one embodiment herein, the multi-granular precoder $X^{(l_1,l_2,\ldots,l_K)}$ may be defined with K=2, $N_1=2$, and $N_2=4$, yielding $X^{(l_1,l_2)}=X_1^{l_1} \otimes X_2^{l_2}$, with $X_2^{l_2}$ being a coarse-granularity precoder and $X_1^{l_1}$ being a finer-granularity precoder as described herein. In at least some embodiments, $X_2^{l_2}$ is a precoder that is configured for the vertical dimension of a 2D antenna array, and $X_1^{l_1}$ is a precoder that is configured for the horizontal dimension of a 2D antenna array, but those precoders are nonetheless applied as described above to a 1D antenna array. Embodiments such as this may therefore be said to apply a higher-dimensioned Kronecker-structured codebook to a lower-dimensioned antenna array in order to exploit that reduction in dimensionality to subgroup antenna elements together in the spatial domain. In other words, the codebook is over-dimensioned in the spatial domain relative to the spatial dimension of the antenna array. In any event, for this example, $X_1^{l_1}$ will have length 2 and $X_2^{l_2}$ will have length 4 meaning that there will be in total 16 elements (8 elements per polarization). The codebook may be applied such that $X^{(l_1,l_2)}=X_1^{l_1} \otimes X_2^{l_2}$ is connected to the 1D antenna array, with X(1) corresponding to the topmost antenna element of the array, X(2) corresponding to the second top most antenna elements, and so on, as shown in FIG. 8. In this way, the virtualization $X_2^{l_2}$ is applied to subarrays in the 1D antenna array and a CSI-RS is used on the resulting antenna elements as illustrated with $X_1(\mathbf{1})$ and $X_1(\mathbf{2})$. Only one polarization is illustrated in FIG. 8, but the same would be done also in the other polarization.

In another embodiment, codebook subset restriction is used on a full-elements (16 elements) CSI-RS in order to reduce the number of possible $X_2^{l_2}$ precoders. This may be beneficial in order to reduce the number of needed auxiliary-elements (4 elements) CSI-RSs in the previous embodiments. In another embodiment, $Q_2 < Q_1$ in order to create a relatively low number of possible $X_2^{l_2}$ vectors. Hence, this will require a relatively low number of 4 ports CSI-RS in previous embodiment. $X_1^{l_1}$ will on the other hand have a finer granularity.

In another embodiment, the CSI-RS is defined such that the receiving node 50 dynamically switches between measuring on the described 16 elements CSI-RS, assuming the codebook $X^{(l_1,l_2)}=X_1^{l_1} \otimes X_2^{l_2}$, and a 4 port CSI-RS corresponding with an associated codebook $X^{(l_1)}=X_1^{l_1}$. Hence the PMI reporting for the different precoders $X_1^{l_1}$, $X_2^{l_2}$ are configured with different time resolutions.

2D Antenna Array

Embodiments herein are also extendable to a 2D antenna array. That is, the antenna array 12 may further include other co-polarized antenna elements aligned in another spatial dimension of the array 12. In this case, the transmitting node 10 may be configured to precode the transmission from different subarrays of the other antenna elements with respective coarse-granularity precoders that are factorizable from another multi-granular precoder targeting the other spatial dimension of the array at different granularities, so as to virtualize the subarrays as other auxiliary elements. And the transmitting node 10 precodes the transmission from the other auxiliary elements with one or more finer-granularity precoders that are also factorizable from the other multi-granular precoder.

A codebook for a 2D antenna array may for instance be created by combining two 1D codebooks by using the Kronecker product. The two-dimensional precoder $X^{N_V K+l}$ is then formed as $X^{N_V K+l}=X_H^k \otimes X_V^l$, where at least one of the precoders $X_H^k$ and $X_V^l$ is a multi-granular precoder created with the previously described structure $$X_H^{(k_1,k_2,\ldots,k_{K_H})} = X_1^{k_1} \otimes X_2^{k_2} \ldots \otimes X_{K_H}^{k_{K_H}}$$

and/or $$X_V^{(l_1,l_2,\ldots,l_{K_V})} = X_1^{l_1} \otimes X_2^{l_2} \ldots \otimes X_{K_V}^{l_{K_V}}.$$

It is here assumed that the index l represents $(l_1,l_2,\ldots,l_K)$ and the index k represents $(k_1,k_2,\ldots,k_K)$. Also, $X_H^k$ is a precoder targeting the horizontal dimension, $X_V^l$ is a precoder targeting the vertical dimension, and $N_V$ is the number of vertical antenna elements. This has the effect of applying the vertical precoder $X_V^l$ on each column of the antenna array and the horizontal precoder $X_H^k$ on each row of the antenna array. In one such embodiment where $M_h=4$, $M_v=8$, and $M_p=2$, the vertical precoder $X_V^l$ may be created such that with K=2, $N_1=2$, and $N_2=4$, whereas the horizontal precoder $X_H^k$ is created using K=1 and $N_1=4$. In another embodiment, the horizontal precoder $X_H$ is created using K=2, $N_1=2$, and $N_2=2$ meaning that the there will be two, possibly different, levels of granularity for both the vertical and the horizontal dimensions.

In at least some embodiments, a wideband precoder $$W_1 = \begin{bmatrix} \tilde{X}^{N_V k+l} & 0 \\ 0 & \tilde{X}^{N_V k+l} \end{bmatrix}$$

may be formed in a similar fashion as in the previous embodiments; that is, by letting $\tilde{X}^{N_V k+l}$ be a multi-column matrix where each column corresponds to a precoder from the 2D Kronecker codebook such as:

$$\tilde{X}^{N_V k+l} = \begin{bmatrix} X_H^{(k_1,k_2,\ldots,k_{K_H})} \otimes X_V^{(l_1,l_2,\ldots,l_{K_V})} \\ \ldots X_H^{(k_1+N_b-1,k_2,\ldots,k_{K_H})} \otimes X_V^{(l_1,l_2,\ldots,l_{K_V})} \end{bmatrix}$$

That is, let the columns of $\tilde{X}^{N_V k+l}$ be a precoder with adjacent $k_l$-indices. As stated in an earlier embodiment, this should be considered as one out of many possible examples of how the wideband precoder may be constructed by grouping precoders of the 2D Kronecker codebook.

Irrespective of whether the antenna array is 1D or 2D, the codebook(s) 26 herein in at least some embodiments are parameterizable to (at least) tailor the codebook(s) 26 for different antenna array configurations of the transmitting node 10. In one embodiment, for example, the one or more parameterized codebooks 26 define sets of different possible coarse-granularity precoders and finer-granularity precoders. The parameters defining the codebook(s) 26 may be signaled from the transmitting node 10 to the receiving node 50. These parameters may be signaled from the transmitting node 10 to the receiving node 50 in the form of a length of the precoders. For example, the previously described codebook may be signaled by signaling the values of the DFT vector lengths, i.e., the parameters $(N_1,N_2,\ldots,N_K)$. In another embodiment also the corresponding oversampling factors $(Q_1,Q_2,\ldots,Q_K)$ are signaled.

Regardless, the parameters of the parametrizable codebook(s) 26 are signaled to the receiving node 50. The signaling may be conducted by e.g. Radio Resource Control (RRC), MAC header element or dynamically using physical downlink control channels. The receiving node 50 knows the general structure of the codebook(s) 26 that applies for the signaled parameters. Based on that and based on the signaled parameters, the receiving node 50 can determine the constituent precoders in the actual precoder codebook(s) 26.

The above description has illustrated embodiments where the different subarrays 34a, 34b have the same number of antenna elements 14, and where the respective coarse-granularity precoders are equal among the different subarrays 34a, 34b. In other embodiments, though, the different subarrays have a different number of antenna elements, and the respective coarse-granularity precoders are not equal. For example, one of the respective coarse-granularity precoders may be a truncated version of another one of the coarse-granularity precoders. Furthermore, embodiments herein are not limited to explicitly Kronecker structured codebooks, but may be extended to cases where an explicit Kronecker codebook structure is not applicable.

In one embodiment, for example, the antenna array 12 consists of an odd number of vertically stacked antenna elements arranged in one or more columns, potentially of different polarization. The antenna array 12 is partitioned in two sub-arrays along the vertical dimension, one top sub-array and one bottom sub-array. Due to the uneven number of vertical antenna elements, the two sub-arrays inevitable contain unequal number of antenna elements. Two sets of DFT beams are formed to match a range of pointing angles, $\alpha_1, \alpha_2, \ldots, \alpha_{N-1}, \alpha_N$, along the vertical dimension; one set for the top sub-array, $X_2^1, \ldots, X_2^N$, and one set for the bottom sub-array, $Y_2^1, \ldots, Y_2^N$, where the $X_2^k$, and $Y_2^k$ are vectors of different number of elements but with equal pointing direction $\alpha_k$. In one special case of this embodiment, the shorter one of $X_2^k$ and $Y_2^k$ may simply be a truncated version of the longer one, meaning that $$X_2^k = \begin{bmatrix} Y_2^k \\ Z_2^k \end{bmatrix}$$

for some $Z_2^k$. The sub-arrays are then combined with another DFT based vector $X_1^m$ corresponding to the co-phasing of the two sub-arrays. The resulting precoder matrix is hence $$X^{(l_1, l_2)} = \begin{bmatrix} X_{1(1)}^{l_1} \cdot X_2^{l_2} \\ X_{1(2)}^{l_1} \cdot Y_2^{l_2} \end{bmatrix}$$

and can be indexed through the index pair $(l_1, l_2)$. In another embodiment the precoders $X_2^{l_2}$ and $Y_2^{l_2}$ are not constrained to use the same index $l_1$; they are thereby able to use different pointing directions.

In one embodiment, the number of sub-arrays is greater than two, and these sub-arrays are then not all of equal size, but they have common pointing angles.

In one embodiment, the pointing angles are given by the DFT beams, potentially oversampled, of one of the sub-arrays. Here this one sub-array is referred to as the main sub-array. What sub-array out of the set of sub-arrays that is the main sub-array may for instance be signaled or given by a predetermined contract between transmitting and receiving nodes. In this way, the pointing angles can be parameterized similar as described above, with the exception that multiple number of DFT vector lengths are needed for each level, one for each sub-array, while only the oversampling factors for the main-arrays are necessary.

In a further embodiment, new levels of granularity may be applied recursively, either using a Kronecker product if the new sub-arrays are of equal size, or using the approach described above with non-identical sub-arrays.

Embodiments herein also concern non-uniform beamsampling. In this regard, the parameterization of pointing angles in the different granularity levels need not be matched to uniformly sampled DFT beams. In this embodiment, the pointing angles of each granularity level is explicitly parameterized through arrays of pointing angles, each array associated with a granularity level, and each pointing angle in an array together with the number of elements yields a DFT beam in the granularity level.

This embodiment facilitates non-uniform distribution of DFT beams, for instance to allow for a denser granularity close to the bore sight of the antenna.

In a similar embodiment, the arrays of pointing angles for one or more of the granularity levels are given by one or more indices pointing to one or more predetermined tables with arrays of pointing angles.

Note that although terminology from 3GPP LTE has been used in this disclosure to exemplify embodiments herein, this should not be seen as limiting the scope of the embodiments to only the aforementioned system. Other wireless systems, including WCDMA, WiMax, UMB and GSM, may also benefit from exploiting embodiments herein.

Note that the transmitting node 10 and receiving node 50 herein may correspond to any pair of nodes configured to transmit radio signals and otherwise interact in the way described. In one embodiment, though, the transmitting node 10 comprises a base station (e.g., an eNodeB in LTE) or a relay node, whereas the receiving node comprises a wireless communication device (e.g., a UE in LTE).

Terminology such as eNodeB and UE should be considering non-limiting and does in particular not imply a certain hierarchical relation between the two; in general "eNodeB" could be considered as device 1 and "UE" device 2, and these two devices communicate with each other over some radio channel. Herein, we also focus on wireless transmissions in the downlink, but embodiments herein are equally applicable in the uplink.

In some embodiments a non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also in some embodiments generic terminology, "radio network node" or simply "network node (NW node)", is used. It can be any kind of network node which may comprise of base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), or even core network node, etc.

Figure 9:
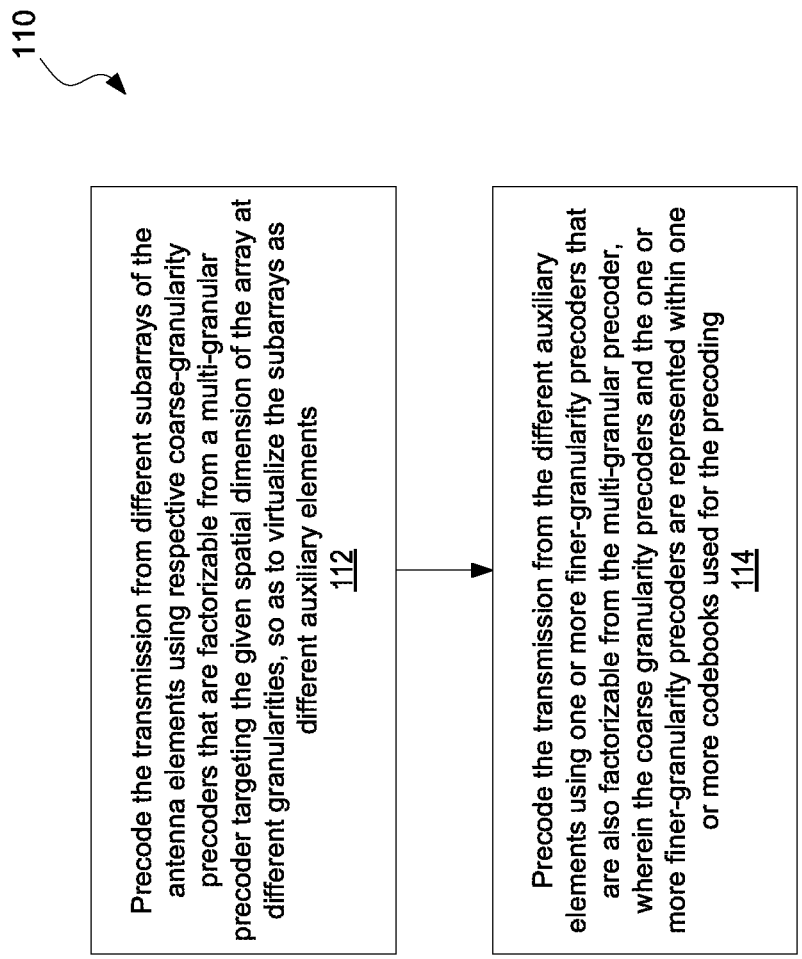
FIG. 9 is a logic flow diagram of a method for precoding a transmission according to one or more embodiments.

In view of the above modifications and variations, those skilled in the art will appreciate that a transmitting radio node 10 herein generally performs the method 110 shown in FIG. 9 for precoding a transmission from an antenna array 12 that includes co-polarized antenna elements 14 aligned in a given spatial dimension of the array 12. The method 110 includes precoding the transmission from different subarrays 34a, 34b of the antenna elements 14 using respective coarse-granularity precoders that are factorizable from a multi-granular precoder targeting the given spatial dimension of the array 12 at different granularities, so as to virtualize the subarrays 34a, 34b as different auxiliary elements 38a, 38b (Block 112). The method 110 also comprises precoding the transmission from the different auxiliary elements 38a, 38b using one or more finer-granularity precoders that are also factorizable from the multi-granular precoder (Block 114). The coarse granularity precoders and the one or more finer-granularity precoders are represented within one or more codebooks used for the precoding.

Figure 10:
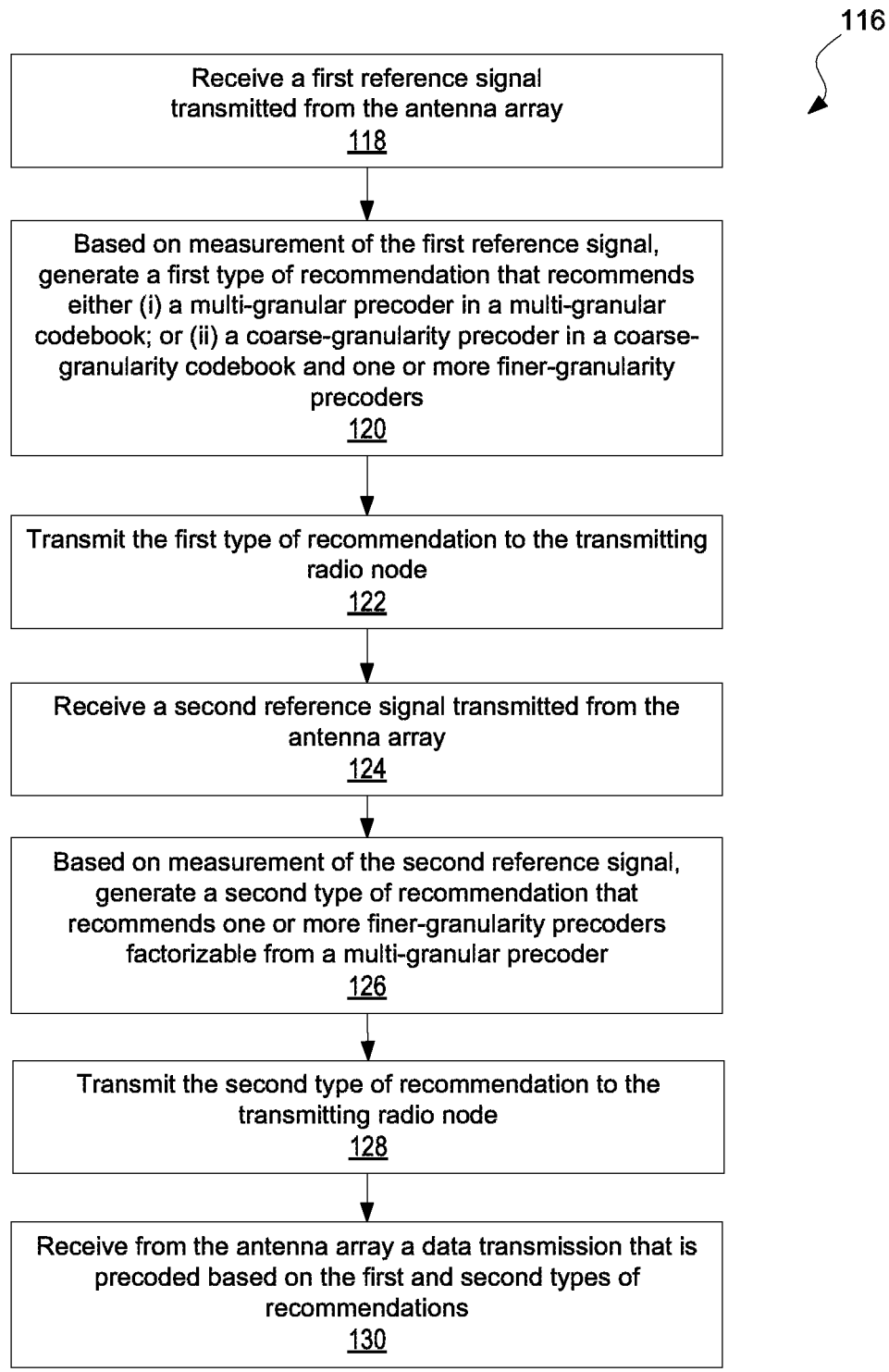
FIG. 10 is a logic flow diagram of a method for receiving a transmission from an antenna array according to one or more embodiments.

Those skilled in the art will appreciate that a receiving radio node 50 herein generally performs the method 116 shown in FIG. 10 for receiving a transmission from an antenna array 12 that includes co-polarized antenna elements 14 aligned in a given spatial dimension of the array 12, wherein the antenna array 12 is associated with a transmitting radio node 10. The method 116 comprises receiving a first reference signal transmitted from the antenna array 12 (Block 118). The method 116 also comprises, based on measurement of the first reference signal, generating a first type of recommendation (Block 120). This first type of recommendation recommends either (i) a multi-granular precoder in a multi-granular codebook targeting the given spatial dimension of the array at different granularities, each multi-granular precoder in the codebook comprising a combination of a coarse-granularity precoder and one or more finer-granularity precoders; or (ii) a coarse-granularity precoder in a coarse-granularity codebook and one or more finer-granularity precoders in one or more finer-granularity codebooks, the combination of which corresponds to a multi-granular precoder targeting the given spatial dimension of the array at different granularities. The method 116 then includes transmitting the first type of recommendation to the transmitting radio node (Block 122). The method 116 also entails receiving a second reference signal transmitted from the antenna array 12 (Block 124). The method involves, based on measurement of the second reference signal, generating a second type of recommendation that recommends one or more finer-granularity precoders factorizable from a multi-granular precoder (Block 126). The method 116 then comprises transmitting the second type of recommendation to the transmitting radio node 10 (Block 128). Finally, the method includes receiving from the antenna array a data transmission that is precoded based on the first and second types of recommendations (Block 130).

Figure 11:
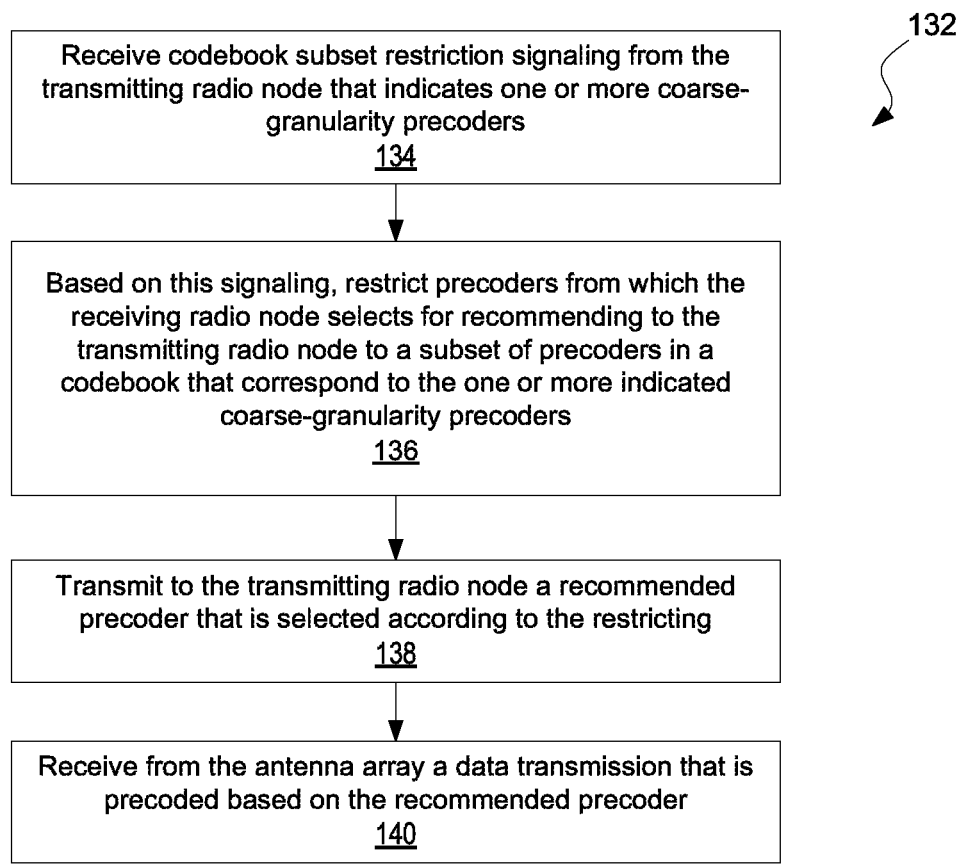
FIG. 11 is a logic flow diagram of a method also for receiving a transmission from an antenna array according to one or more embodiments.

Embodiments herein also include a method 132 for receiving a transmission from an antenna array 12 that includes co-polarized antenna elements 14 aligned in a given spatial dimension of the array 12, as shown in FIG. 11. The method 132 is performed by a receiving radio node 50. The method 132 includes receiving codebook subset restriction signaling from the transmitting radio node that indicates one or more coarse-granularity precoders, each coarse-granularity precoder factorizable along with one or more finer-granularity precoders from a multi-granular precoder targeting the given spatial dimension of the array at different granularities (Block 134). Based on this signaling, the method 132 includes restricting precoders from which the receiving radio node 50 selects for recommending to the transmitting radio node 10 to a subset of precoders in a codebook 26 that correspond to the one or more indicated coarse-granularity precoders (Block 136). The method 132 also entails transmitting to the transmitting radio node 10 a recommended precoder that is selected according to the restricting (Block 138). Finally, the method 132 includes receiving from the antenna array 12 a data transmission that is precoded based on the recommended precoder (Block 140).

Figure 12:
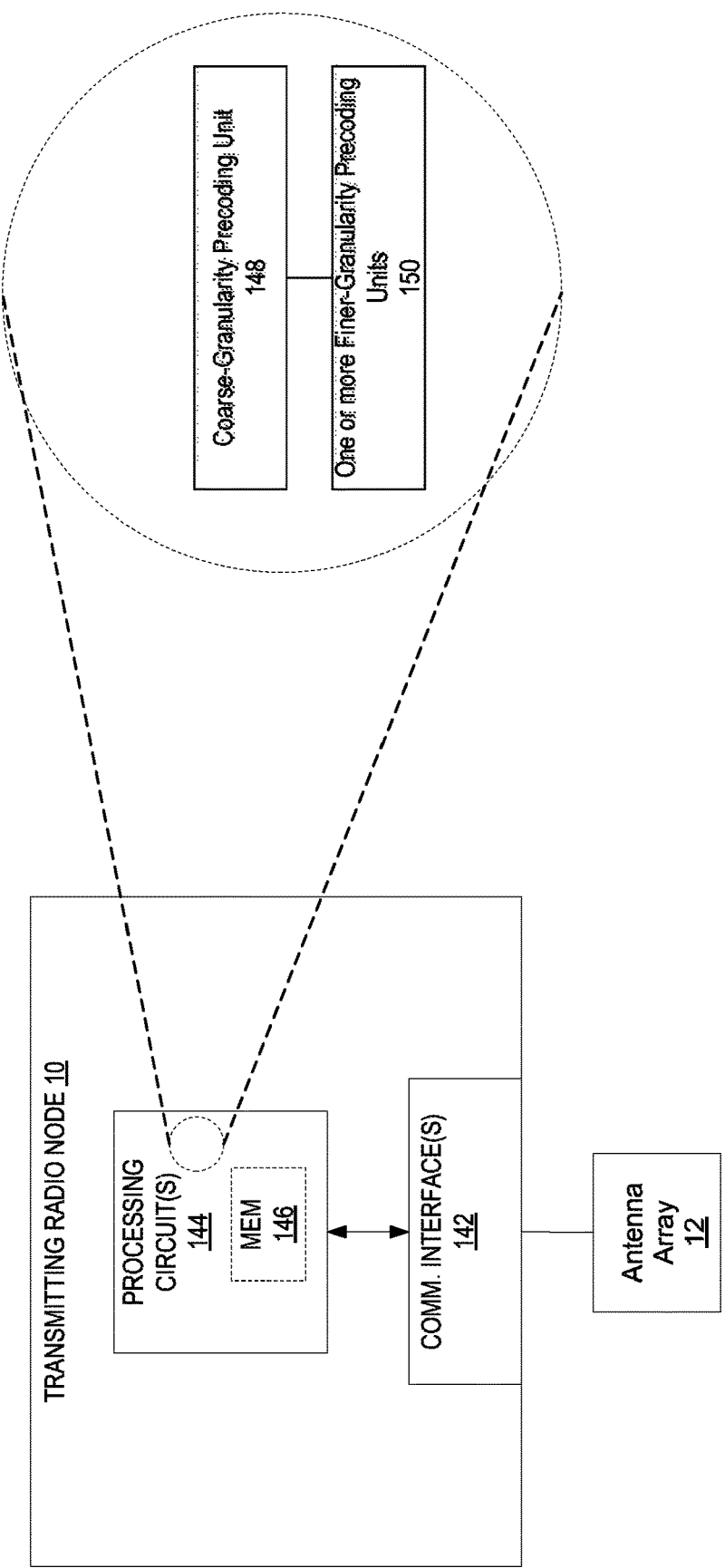
FIG. 12 is a block diagram of a transmitting radio node according to some embodiments.

FIG. 12 illustrates an example transmitting radio node 10 (e.g., a base station) configured according to one or more embodiments herein. The transmitting radio node 10 comprises one or more communication interfaces 142 for communicating with the receiving radio node 50 via the antenna array 12. The one or more communication interfaces may also interface with other nodes in a wireless communication network. For communicating with the receiving radio node 50, though, the interface(s) 142 may include transceiver circuits that, for example, comprise transmitter circuits and receiver circuits that operate according to LTE or other known standards. The transmitting radio node 10 also comprises processing circuits 144, which may comprise one or more processors, hardware circuits, firmware, or a combination thereof. Memory 146 may comprise one or more volatile and/or non-volatile memory devices. Program code for controlling operation of the transmitting node 10 is stored in a non-volatile memory, such as a read-only memory or flash memory. Temporary data generated during operation may be stored in random access memory. The program code stored in memory, when executed by the processing circuit(s), causes the processing circuit(s) to perform the methods shown above.

FIG. 12 illustrates the main functional components of the processing circuit(s) 144 according to one exemplary embodiment. The functional components include a coarse-granularity precoding unit 148 and one or more finer-granularity precoding units 150, e.g., as depicted in FIGS. 1A-1D. In one embodiment, these units each comprise a programmable circuit that is configured by program code stored in memory to perform their respective functions. In other embodiments, one or more of the functional components may be implemented, in whole or in part, by hardware circuits. Regardless, the units are collectively configured to perform the method in FIG. 9.

Also in view of the above modifications and variations, those skilled in the art will appreciate that FIG. 11 illustrates an example receiving radio node 50 configured according to one or more embodiments herein. The receiving radio node 50 comprises one or more communication interfaces 152 for communicating with the transmitting radio node 10 one or more antennas. The interface(s) 152 may include transceiver circuits that, for example, comprise transmitter circuits and receiver circuits that operate according to LTE or other known standards. The receiving radio node 50 also comprises processing circuits 154, which may comprise one or more processors, hardware circuits, firmware, or a combination thereof. Memory 156 may comprise one or more volatile and/or non-volatile memory devices. Program code for controlling operation of the receiving radio node 50 is stored in a non-volatile memory, such as a read-only memory or flash memory. Temporary data generated during operation may be stored in random access memory. The program code stored in memory, when executed by the processing circuit(s), causes the processing circuit(s) to perform the methods shown above.

Figure 13:
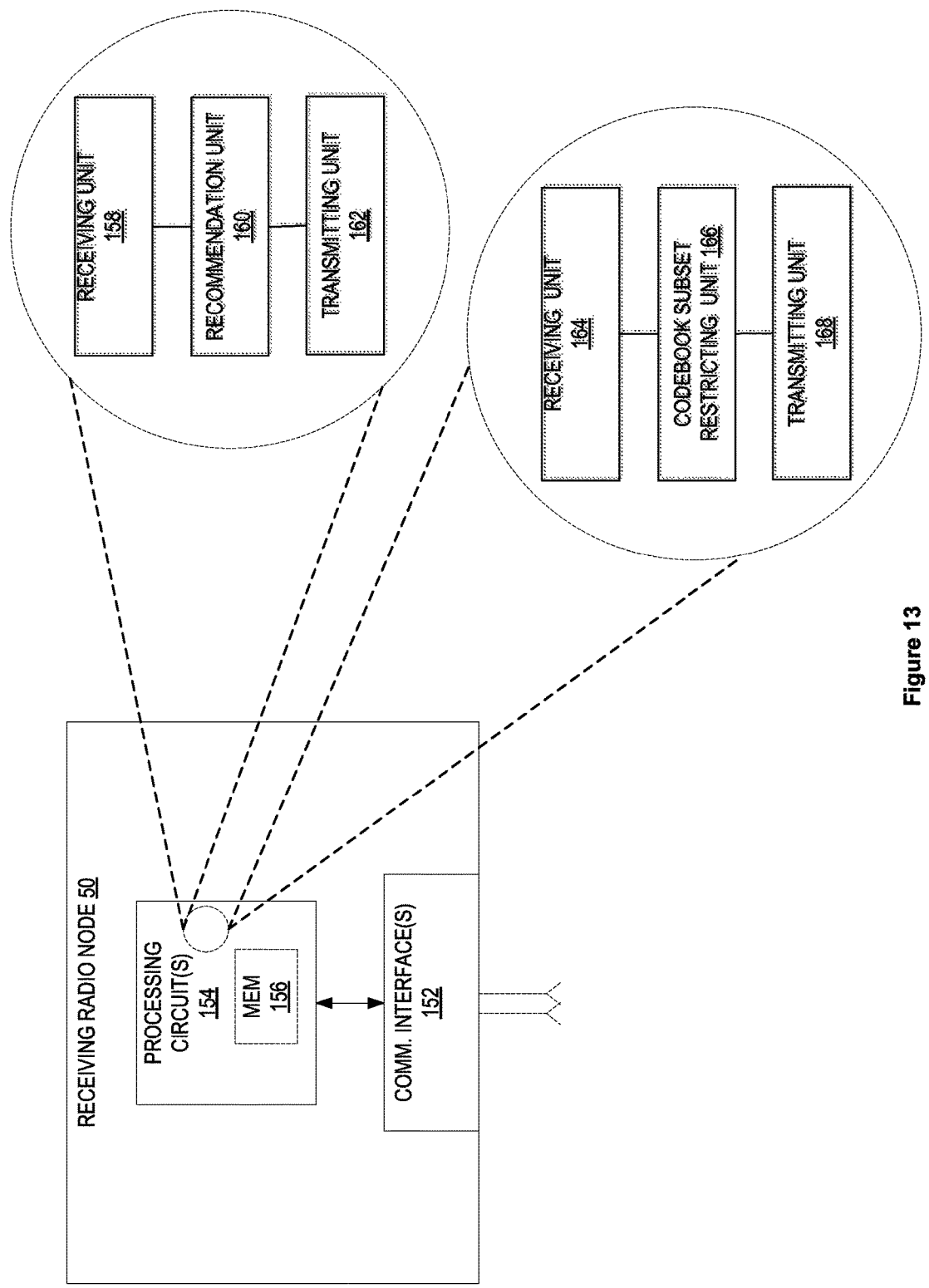
FIG. 13 is a block diagram of a receiving radio node according to one or more embodiments.

FIG. 13 illustrates the main functional components of the processing circuit(s) 154 according to different embodiments. In one exemplary embodiment, the functional components include a receiving unit 158, a recommendation unit 160, and a transmitting unit 162. In one embodiment, these units each comprise a programmable circuit that is configured by program code stored in memory to perform their respective functions. In other embodiments, one or more of the functional components may be implemented, in whole or in part, by hardware circuits. Regardless, the units are collectively configured to perform the method in FIG. 10. In another embodiment, by contrast, the functional components include a receiving unit 164, a codebook subset restricting unit 166, and a transmitting unit 168. Again, in one embodiment, these units each comprise a programmable circuit that is configured by program code stored in memory to perform their respective functions. In other embodiments, one or more of the functional components may be implemented, in whole or in part, by hardware circuits. Regardless, the units are collectively configured to perform the method in FIG. 11.

Embodiments herein also include a computer program comprising instructions which, when executed by at least one processor of a radio node 10, 15, causes the radio node to carry out any of the methods herein. In one or more embodiments, a carrier containing the computer program is one of an electronic signal, optical signal, radio signal, or computer readable storage medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for precoding a transmission from an antenna array that includes co-polarized antenna elements aligned in a given spatial dimension of the array, wherein the method is performed by a transmitting radio node for precoding the transmission to a receiving radio node and comprises:
   precoding the transmission from different subarrays of the antenna elements using respective coarse-granularity precoders that are factorizable from a multi-granular precoder targeting the given spatial dimension of the array at different granularities, so as to virtualize the subarrays as different auxiliary elements; and
   precoding the transmission from the different auxiliary elements using one or more finer granularity precoders that are also factorizable from the multi-granular precoder, wherein the coarse granularity precoders and the one or more finer-granularity precoders are represented within one or more codebooks used for said precoding;
   wherein the multi-granular precoder is based on a Kronecker Product of a coarse-granularity precoder and one or more finer-granularity precoders.

2. The method of claim 1, wherein the transmission comprises user data or a reference signal dedicated to the receiving radio node.

3. The method of claim 1, further comprising:
   transmitting a full-elements reference signal from the antenna elements without precoding;
   precoding transmission of an auxiliary-elements reference signal from the different subarrays of the antenna elements using respective coarse-granularity precoders that are factorizable from a multi-granular precoder targeting the given spatial dimension of the array at different granularities, so as to virtualize the subarrays as the different auxiliary elements; and
   transmitting the precoded, auxiliary-elements reference signal to the receiving radio node.

4. The method of claim 3, wherein the full-elements and auxiliary-elements reference signals are common reference signals transmitted from the antenna array to multiple receiving radio nodes.

5. The method of claim 3, wherein transmitting the precoded, auxiliary-elements reference signal comprises transmitting the precoded, auxiliary-elements reference signal more often than transmitting the full-elements reference signal.

6. The method of claim 1, further comprising receiving from the receiving radio node, at different times, a complete recommendation that recommends both a coarse granularity precoder and a finer granularity precoder, and a partial recommendation that recommends only a finer granularity precoder, and wherein said precoding uses both a coarse-granularity precoder from the complete recommendation and a finer-granularity precoder from the partial recommendation.

7. The method of claim 6, further comprising receiving a partial recommendation more often than receiving a complete recommendation.

8. The method of claim 1, further comprising configuring the receiving radio node to restrict precoders from which the receiving radio node selects, for recommending to the transmitting radio node, to a subset of precoders in a codebook that correspond to one or more coarse-granularity precoders, by transmitting codebook subset restriction signaling to the receiving radio node indicating those one or more coarse-granularity precoders.

9. The method of claim 1, wherein the different subarrays have the same number of antenna elements, and wherein the respective coarse-granularity precoders are equal among the different subarrays.

10. The method of claim 1, wherein one or more parameterized codebooks that define sets of different possible coarse-granularity precoders and finer-granularity precoders are signaled from the transmitting radio node to the receiving radio node in the form of a length of said precoders.

11. The method of claim 1, wherein the antenna array is a one-dimensional array in the spatial domain and said given spatial dimension is either a horizontal dimension or a vertical dimension.

12. The method of claim 1, wherein the antenna array is a two-dimensional array in the spatial domain such that the antenna array has a horizontal dimension and a vertical dimension, and wherein said given spatial dimension is either the horizontal dimension or the vertical dimension.

13. The method of claim 1, wherein the coarse-granularity precoder and the one or more finer-granularity precoders are Discrete Fourier Transform, DFT, vectors, wherein the product of the DFT vectors' lengths equals the number of the antenna elements aligned along the given spatial dimension.

14. A method for receiving a transmission from an antenna array that includes co-polarized antenna elements aligned in a given spatial dimension of the array, wherein the antenna array is associated with a transmitting radio node, wherein the method is performed by a receiving radio node and comprises:
   receiving a first reference signal transmitted from the antenna array;
   based on measurement of the first reference signal, generating a first type of recommendation that recommends either:
      a multi-granular precoder in a multi-granular codebook targeting the given spatial dimension of the array at different granularities, each multi-granular precoder in the codebook comprising a combination of a coarse-granularity precoder and one or more finer-granularity precoders; or
      a coarse-granularity precoder in a coarse-granularity codebook and one or more finer-granularity precoders in one or more finer-granularity codebooks, the combination of which corresponds to a multi-granular precoder targeting the given spatial dimension of the array at different granularities;

transmitting the first type of recommendation to the transmitting radio node;

receiving a second reference signal transmitted from the antenna array;

based on measurement of the second reference signal, generating a second type of recommendation that recommends one or more finer-granularity precoders factorizable from a multi-granular precoder;

transmitting the second type of recommendation to the transmitting radio node; and receiving from the antenna array a data transmission that is precoded based on the first and second types of recommendations.

15. The method of claim 14, wherein the first reference signal is a full-elements reference signal transmitted from the antenna elements without precoding, and the second reference signal is an auxiliary-elements reference signal transmitted from different subarrays of the antenna elements using respective coarse-granularity precoders that are factorizable from a multi-granular precoder targeting the given spatial dimension of the array at different granularities, so as to virtualize the subarrays as different auxiliary elements, wherein the second type of recommendation exclusively recommends one or more finer-granularity precoders, without also recommending a coarse-granularity precoder.

16. The method of claim 15, further comprising receiving the precoded, auxiliary-elements reference signal more often than receiving the full-elements reference signal.

17. The method of claim 14, further comprising transmitting the second type of recommendation to the transmitting radio node more often than transmitting the first type of recommendation to the transmitting radio node.

18. The method of claim 14, wherein both the first and second reference signals are full elements reference signals transmitted from the antenna elements without precoding, and wherein said generating the second type of recommendation comprises generating the second type of recommendation to exclusively recommend one or more finer-granularity precoders, without also recommending a coarse-granularity precoder.

19. The method of claim 14, wherein both the first and second reference signals are full elements reference signals transmitted from the antenna elements without precoding, wherein generating the second type of recommendation comprises generating the second type of recommendation to recommend either:

a multi-granular precoder in the multi-granular codebook, wherein the multi-granular precoder factors into the coarse-granularity precoder from the first recommendation; or a coarse-granularity precoder in the coarse-granularity codebook and one or more finer-granularity precoders in one or more finer-granularity codebooks, wherein the coarse granularity precoder is the coarse-granularity precoder from the first type of recommendation.

20. The method of claim 14, wherein the antenna array is a one-dimensional array in the spatial domain and said given spatial dimension is either a horizontal dimension or a vertical dimension.

21. The method of claim 14, wherein the antenna array is a two-dimensional array in the spatial domain such that the antenna array has a horizontal dimension and a vertical dimension, and wherein said given spatial dimension is either the horizontal dimension or the vertical dimension.

22. The method of claim 14, wherein a multi-granular precoder is based on a Kronecker Product of a coarse-granularity precoder and one or more finer-granularity precoders.

23. The method of claim 14, wherein the coarse-granularity precoder and the one or more finer-granularity precoders are Discrete Fourier Transform, DFT, vectors, wherein the product of the DFT vectors' lengths equals the number of the antenna elements aligned along the given spatial dimension.

24. A method for receiving a transmission from an antenna array that includes co-polarized antenna elements aligned in a given spatial dimension of the array, wherein the antenna array is associated with a transmitting radio node, wherein the method is performed by a receiving radio node and comprises:

receiving codebook subset restriction signaling from the transmitting radio node that indicates one or more coarse-granularity precoders, each coarse-granularity precoder factorizable along with one or more finer-granularity precoders from a multi-granular precoder targeting the given spatial dimension of the array at different granularities; and based on said signaling, restricting precoders from which the receiving radio node selects for recommending to the transmitting radio node to a subset of precoders in a codebook that correspond to the one or more indicated coarse-granularity precoders;

transmitting to the transmitting radio node a recommended precoder that is selected according to said restricting; and receiving from the antenna array a data transmission that is precoded based on the recommended precoder;

wherein the multi-granular precoder is based on a Kronecker Product of a coarse-granularity precoder and one or more finer-granularity precoders.

25. The method of claim 24, further characterized by:

receiving a full-elements reference signal transmitted from the antenna elements without precoding;

based on measurement of the full-elements reference signal, selecting said recommended precoder as either:

a multi-granular precoder in a multi-granular codebook, from amongst a subset of multi-granular precoders in the codebook that factorize into any of the one or more coarse-granularity precoders indicated by the codebook subset restriction signaling; or a coarse-granularity precoder in a coarse-granularity codebook, from amongst the one or more coarse-granularity precoders indicated by the codebook subset restriction signaling; and transmitting the recommendation to the transmitting radio node.

26. The method of claim 24, wherein one or more parameterized codebooks that define sets of different possible coarse-granularity precoders and finer-granularity precoders are signaled from the transmitting radio node to the receiving radio node in the form of a length of said precoders.

27. The method of claim 24, wherein the antenna array is a one-dimensional array in the spatial domain and said given spatial dimension is either a horizontal dimension or a vertical dimension.

28. The method of claim 24, wherein the antenna array is a two-dimensional array in the spatial domain such that the antenna array has a horizontal dimension and a vertical dimension, and wherein said given spatial dimension is either the horizontal dimension or the vertical dimension.

29. The method of claim 24, wherein the coarse-granularity precoder and the one or more finer-granularity precoders are Discrete Fourier Transform, DFT, vectors, wherein the product of the DFT vectors' lengths equals the number of the antenna elements aligned along the given spatial dimension.

30. A transmitting radio node configured to precode a transmission from an antenna array to a receiving radio node, wherein the antenna array includes co polarized antenna elements aligned in a given spatial dimension of the array, the transmitting radio node comprising one or more processing circuits and a memory, the memory containing program code executable by the one or more processing circuits whereby the transmitting radio node is configured to:
  precode the transmission from different subarrays of the antenna elements using respective coarse-granularity precoders that are factorizable from a multi-granular precoder targeting the given spatial dimension of the array at different granularities, so as to virtualize the subarrays as different auxiliary elements; and
  precode the transmission from the different auxiliary elements using one or more finer granularity precoders that are also factorizable from the multi-granular precoder, wherein the coarse granularity precoders and the one or more finer-granularity precoders are represented within one or more codebooks used for said precoding; and
  wherein the multi-granular precoder is based on a Kronecker Product of a coarse-granularity precoder and one or more finer-granularity precoders.

31. A receiving radio node configured to receive a transmission from an antenna array that includes co-polarized antenna elements aligned in a given spatial dimension of the array, wherein the antenna array is associated with a transmitting radio node, the receiving radio node comprising one or more processing circuits and a memory, the memory containing program code executable by the one or more processing circuits whereby the receiving radio node is configured to
  receive a first reference signal transmitted from the antenna array;
  based on measurement of the first reference signal, generate a first type of recommendation that recommends either:
    a multi-granular precoder in a multi-granular codebook targeting the given spatial dimension of the array at different granularities, each multi-granular precoder in the codebook comprising a combination of a coarse-granularity precoder and one or more finer-granularity precoders; or
    a coarse-granularity precoder in a coarse-granularity codebook and one or more finer-granularity precoders in one or more finer-granularity codebooks, the combination of which corresponds to a multi-granular precoder targeting the given spatial dimension of the array at different granularities;
  transmit the first type of recommendation to the transmitting radio node;
  receive a second reference signal transmitted from the antenna array;
  based on measurement of the second reference signal, generate a second type of recommendation that recommends one or more finer-granularity precoders factorizable from a multi-granular precoder in the multi-granular codebook, without also recommending a coarse-granularity precoder;
  transmit the second type of recommendation to the transmitting radio node; and
  receive from the antenna array a data transmission that is precoded based on the first and second types of recommendations.

32. A receiving radio node configured to receive a transmission from an antenna array that includes co-polarized antenna elements aligned in a given spatial dimension of the array, wherein the antenna array is associated with a transmitting radio node, the receiving radio node comprising one or more processing circuits and a memory, the memory containing program code executable by the one or more processing circuits whereby the receiving radio node is configured to:
  receive codebook subset restriction signaling from the transmitting radio node that indicates one or more coarse-granularity precoders, each coarse-granularity precoder factorizable along with one or more finer-granularity precoders from a multi-granular precoder targeting the given spatial dimension of the array at different granularities; and
  based on said signaling, restrict precoders from which the receiving radio node selects for recommending to the transmitting radio node to a subset of precoders in a codebook that correspond to the one or more indicated coarse-granularity precoders;
  transmit to the transmitting radio node a recommended precoder that is selected according to said restricting; and
  receive from the antenna array a data transmission that is precoded based on recommended precoder;
  wherein the multi-granular precoder is based on a Kronecker Product of a coarse-granularity precoder and one or more finer-granularity precoders.

* * * * *